(12) United States Patent
Kushner

(10) Patent No.: US 10,195,534 B2
(45) Date of Patent: Feb. 5, 2019

(54) GAME MECHANICS FOR TRANSFORMATION OF AN ARRAY INCLUDING A PLURALITY OF ROWS AND/OR COLUMNS

(71) Applicant: Perfect Square Studios LLC, Raleigh, NC (US)

(72) Inventor: Samuel Adam Kushner, Raleigh, NC (US)

(73) Assignee: Perfect Square Studios LLC, Raleigh, NC (US)

( * ) Notice: Subject to any disclaimer, the term of this patent is extended or adjusted under 35 U.S.C. 154(b) by 0 days.

(21) Appl. No.: 15/485,713

(22) Filed: Apr. 12, 2017

(65) Prior Publication Data

US 2017/0296932 A1 Oct. 19, 2017

Related U.S. Application Data

(60) Provisional application No. 62/322,964, filed on Apr. 15, 2016.

(51) Int. Cl.

| | |
|---|---|
| A63F 9/24 | (2006.01) |
| A63F 13/822 | (2014.01) |
| A63F 13/2145 | (2014.01) |
| A63F 13/92 | (2014.01) |
| A63F 13/32 | (2014.01) |
| A63F 13/33 | (2014.01) |

(Continued)

(52) U.S. Cl.
CPC ........ *A63F 13/822* (2014.09); *A63F 13/2145* (2014.09); *A63F 13/32* (2014.09); *A63F 13/327* (2014.09); *A63F 13/33* (2014.09); *A63F 13/332* (2014.09); *A63F 13/335* (2014.09); *A63F 13/426* (2014.09); *A63F 13/46* (2014.09); *A63F 13/52* (2014.09); *A63F 13/92* (2014.09); *A63F 13/95* (2014.09); *G06F 3/0482* (2013.01); *G06F 3/04845* (2013.01)

(58) Field of Classification Search
CPC .... G07F 17/34; G07F 17/3265; G07F 17/326; A63F 13/822
See application file for complete search history.

(56) References Cited

U.S. PATENT DOCUMENTS 9,120,010 B2 9/2015 Karn
2004/0198489 A1* 10/2004 Kaminkow ......... G07F 17/3265
463/20

(Continued)

*Primary Examiner* — Steve Rowland
(74) *Attorney, Agent, or Firm* — Myers Bigel, P.A.

(57) ABSTRACT

A method of operating a computing device includes displaying a game field including field positions with a plurality of game tiles, receiving a first user input indicating the selection of a starting field position, receiving a second user input indicating the selection of an ending field position, where the starting field position and the ending field position define a grouping of at least three game tiles in field positions between the starting and ending field positions, determining a point of rotation for the grouping, exchanging respective game tiles of the grouping from a respective first field position to a respective second field position that is calculated relative to the point of rotation, displaying the exchanged game tiles on the game field in the respective second field positions, determining that a game tile matching condition is present, and indicating the game tile matching condition to the user.

20 Claims, 32 Drawing Sheets

(51) Int. Cl.
*A63F 13/335* (2014.01)
*A63F 13/327* (2014.01)
*A63F 13/332* (2014.01)
*A63F 13/95* (2014.01)
*A63F 13/426* (2014.01)
*A63F 13/46* (2014.01)
*A63F 13/52* (2014.01)
*G06F 3/0482* (2013.01)
*G06F 3/0484* (2013.01)

(56) References Cited

U.S. PATENT DOCUMENTS

| | | | |
|---|---|---|---|
| 2005/0054436 A1* | 3/2005 | Frizzell | G07F 17/3265 463/25 |
| 2008/0058060 A1* | 3/2008 | Okada | G07F 17/34 463/20 |
| 2009/0088242 A1* | 4/2009 | Richardson | G07F 17/3211 463/25 |
| 2009/0227337 A1* | 9/2009 | Langille | G07F 17/3265 463/20 |
| 2013/0023329 A1* | 1/2013 | Saunders | G07F 17/34 463/20 |

\* cited by examiner

GAME MECHANICS FOR TRANSFORMATION OF AN ARRAY INCLUDING A PLURALITY OF ROWS AND/OR COLUMNS

CROSS-REFERENCE TO RELATED APPLICATION

The present application claims priority under 35 U.S.C. § 119 to U.S. Provisional Patent Application Ser. No. 62/322,964, filed Apr. 15, 2016, the content of which is incorporated herein by reference as if set forth in its entirety.

FIELD OF INVENTION

The present inventive concepts relate to electronic games, and, more specifically, to controlling, for the purposes of a game mechanic, a user interface of a computer device responsive to user input related to displayed elements on the user interface.

BACKGROUND

There are multiple forms of electronic games which are designed to be played on a computer or other personal computer device, such as a phone or tablet. Such games often include graphical elements which are designed to be manipulated by the player of the game. Often, such games use colors or shapes to graphically portray different aspects of game play.

One category of electronic games includes tile-matching video games where the player manipulates game tiles in order to make them disappear according to a matching criterion. In some tile-matching games, that criterion is the arrangement of a given number of tiles of the same type so that they are adjacent each other. That number is often three or more, and the corresponding subset of tile-matching games is sometimes referred to as "match-three." When a match occurs, the matching game tiles are removed from the field, to be replaced by additional game tiles. Game play continues until a particular objective of the game, such as achieving a particular score or other game goal, is met.

Within a particular game, a game mechanic refers to a method or rule of gameplay which governs interaction with the game. A game mechanic may dictate which moves are allowed and/or what happens when a particular move is made.

In some match-three games, manipulating the game tiles involves swapping two tiles with one another. The player can swap two tiles each turn of the game in order to achieve the matching criterion. Similarly, a game mechanic of a match-three game can also dictate what types of combinations of game tiles meet the matching criterion and what happens once a match is made. In some match-three games, game tiles which match are removed from the board to be replaced by other game tiles.

Different types of match-three electronic games can differentiate themselves from one another through their game mechanics. Providing new game mechanics may be advantageous.

SUMMARY

Some embodiments of the present inventive concepts are directed to apparatus, methods, and computer program products for controlling elements on a user interface associated with an electronic game responsive to user input.

According to some embodiments of the present inventive concepts, a computer device may include a display circuit configured to display a game field including field positions organized in a plurality of rows and a plurality of columns with a plurality of user-selectable game tiles within respective ones of the field positions, where the user-selectable game tiles include at least two game tile categories, a user input circuit configured to receive input from a user of the computer device selecting respective game tiles on the game field, and a processor. The processor may be configured to perform operations including receiving a first user input from the user input circuit indicating a starting field position on the game field, receiving a second user input from the user input circuit indicating an ending field position on the game field, where the starting field position and the ending field position define a grouping of at least three game tiles in field positions on the game field between the starting field position and the ending field position, determining a point of rotation for the grouping within the grouping, exchanging respective game tiles of the grouping from a respective first field position to a respective second field position that is calculated relative to the point of rotation, displaying the exchanged game tiles on the game field in the respective second field positions, determining that a game tile matching condition is present on the game field, where the game tile matching condition includes at least three game tiles of a same game tile category adjacent one another in a horizontal row or a vertical column, and modifying the output of the display circuit to indicate the game tile matching condition to the user of the computer device.

In some embodiments, the grouping may include a series of field positions along a vertical, horizontal, or diagonal line.

In some embodiments, the grouping may include a rectangular grouping of game tiles including at least two rows of field positions and at least two columns of field positions.

In some embodiments, the first user input may include a first vertex of the rectangular grouping and the second user input may include a second vertex of the rectangular grouping that is diagonally opposite the first vertex.

In some embodiments, the operations may further include receiving a third user input indicating a third vertex of the rectangular grouping.

In some embodiments, the grouping may include a polygon including at least four field positions.

In some embodiments, the operations may further include exchanging the respective game tiles of the grouping by displaying, via the display circuit, a visual rotation of the game tiles about the point of rotation in a clockwise or counterclockwise rotation in a direction parallel to the game field.

In some embodiments, the game field may further include a blocking game tile, and the operations may further include indicating that the grouping is not possible if the grouping would include the blocking game tile.

In some embodiments, the game field may further include a blocking game tile, and the operations may further include indicating that the exchange of the respective game tiles of the grouping is not possible if the visual rotation of the game tiles about the point of rotation would intercept with the blocking game tile.

In some embodiments, the operations may further include exchanging the respective game tiles of the grouping by displaying, via the display circuit, a contracting visual effect of the game tiles of the grouping to the point of rotation followed by an expanding visual effect of the game tiles of the grouping to the second field positions.

In some embodiments, the operations may further include exchanging the respective game tiles of the grouping by displaying, via the display circuit, a fading out visual effect of the game tiles of the grouping followed by a fading in visual effect of the game tiles of the grouping to the second field positions.

In some embodiments, the operations may further include exchanging the respective game tiles of the grouping by displaying, via the display circuit, a serial replacement of respective game tiles within the grouping by replacing the respective game tile at the first field position with a second game tile at the second field position.

In some embodiments, the operations may further include displaying a graphical representation of the grouping to the user of the computer device responsive to receiving the first user input and the second user input and prior to exchanging the respective game tiles of the grouping.

In some embodiments, the graphical representation of the defined grouping may include a displayed visual effect which alters an appearance of respective ones of the game tiles of the grouping.

According to some embodiments of the present inventive concepts, a method of operating a computing device may include displaying a game field including field positions organized in a plurality of rows and a plurality of columns with a plurality of user-selectable game tiles within respective ones of the field positions, where the user-selectable game tiles include at least two game tile categories, receiving a first user input from a user of the computing device indicating a starting field position on the game field, receiving a second user input indicating an ending field position on the game field, where the starting field position and the ending field position define a grouping of at least three game tiles in field positions on the game field between the starting field position and the ending field position, determining a point of rotation for the grouping within the grouping, exchanging respective game tiles of the grouping from a respective first field position to a respective second field position that is calculated relative to the point of rotation, displaying the exchanged game tiles on the game field in the respective second field positions, determining that a game tile matching condition is present on the game field, where the game tile matching condition includes at least three game tiles of a same game tile category adjacent one another in a horizontal row or a vertical column, and indicating the game tile matching condition to the user.

In some embodiments, the grouping may include a rectangular grouping of game tiles including at least two rows of field positions and at least two columns of field positions.

In some embodiments, the first user input may include a first vertex of the rectangular grouping and the second user input may include a second vertex of the rectangular grouping that is diagonally opposite the first vertex.

In some embodiments, the method may further include receiving a third user input indicating a third vertex.

In some embodiments, the method may further include exchanging the respective game tiles of the grouping by displaying a visual rotation of the game tiles about the point of rotation in a clockwise or counterclockwise rotation in a direction parallel to the game field.

According to some embodiments of the present inventive concepts, a computer program product may include a tangible non-transitory computer readable storage medium including computer readable program code embodied in the computer readable storage medium. The computer readable program code, when executed by at least one processor, may cause the at least one processor to perform operations including displaying a game field including field positions organized in a plurality of rows and a plurality of columns with a plurality of user-selectable game tiles within respective ones of the field positions, where the user-selectable game tiles include at least two game tile categories, receiving a first user input from a user of the computing device indicating a starting field position on the game field, receiving a second user input indicating an ending field position on the game field, where the starting field position and the ending field position define a grouping of at least three game tiles in field positions on the game field between the starting field position and the ending field position, determining a point of rotation for the grouping within the grouping, exchanging respective game tiles of the grouping from a respective first field position to a respective second field position that is calculated relative to the point of rotation, displaying the exchanged game tiles on the game field in the respective second field positions, determining that a game tile matching condition is present on the game field, where the game tile matching condition includes at least three game tiles of a same game tile category adjacent one another in a horizontal row or a vertical column, and indicating the game tile matching condition to the user.

In some embodiments, the grouping may include a rectangular grouping of game tiles include at least two rows of field positions and at least two columns of field positions. The first user input may include a first vertex of the rectangular grouping and the second user input may include a second vertex of the rectangular grouping that is diagonally opposite the first vertex.

It is noted that aspects of the present inventive concepts described with respect to one embodiment, may be incorporated in a different embodiment although not specifically described relative thereto. That is, all embodiments and/or features of any embodiment can be combined in any way and/or combination. These and other objects and/or aspects of the present inventive concepts are explained in detail in the specification set forth below.

BRIEF DESCRIPTION OF THE DRAWINGS

The accompanying figures are included to provide a further understanding of the present inventive concepts, and are incorporated in and constitute a part of this specification. The drawings illustrate some embodiments of the present inventive concepts and, together with the description, serve to explain principles of the present inventive concepts. Like numbers refer to like elements throughout.

DETAILED DESCRIPTION

Figure 1:
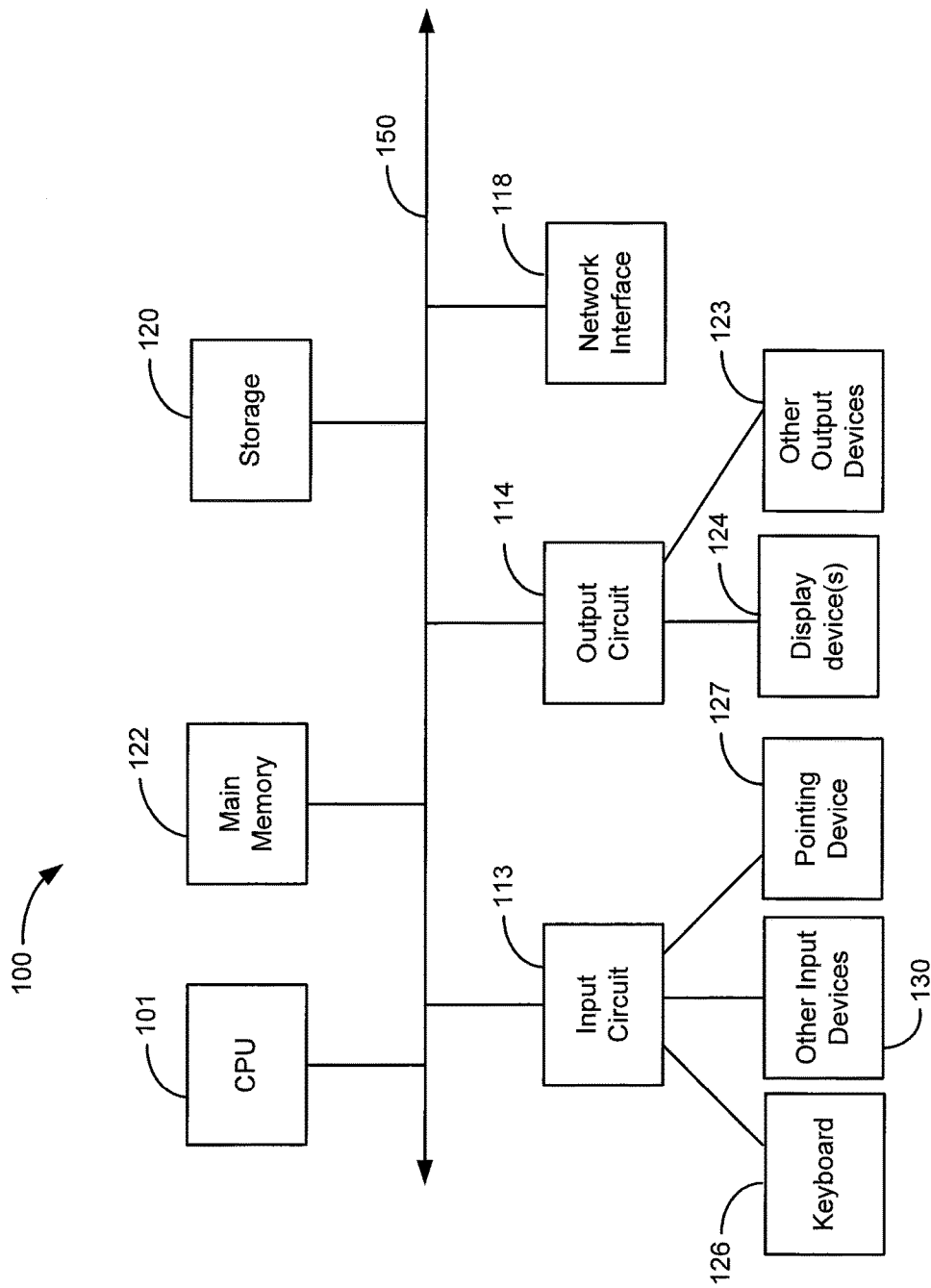
FIG. 1 is a block diagram illustrating an example computer device for executing a computer game according to some embodiments of the present inventive concepts.

In the following description, for purposes of explanation and not limitation, specific details are set forth such as particular architectures, interfaces, techniques, etc. in order to provide a thorough understanding of the present inventive concepts. However, it will be apparent to those skilled in the art that the present inventive concepts may be practiced in other embodiments that depart from these specific details. In other instances, detailed descriptions of well known devices, circuits, and methods are omitted so as not to obscure the description of the present inventive concepts with unnecessary detail. While various modifications and alternative forms of the embodiments described herein may be made, specific embodiments are shown by way of example in the drawings and will herein be described in detail. It should be understood, however, that there is no intent to limit the inventive concepts to the particular forms disclosed, but on the contrary, the inventive concepts are to cover all modifications, equivalents, and alternatives falling within the spirit and scope of the inventive concepts as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items, and may be abbreviated as "/".

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

Example embodiments are described below with reference to block diagrams and/or flowchart illustrations of methods, apparatus (systems and/or devices), and/or computer program products. It is understood that a block and/or operation of the block diagrams and/or flowchart illustrations, and combinations of blocks and/or operations in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process, such that the instructions, which execute on the computer or other programmable apparatus, provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a non-transitory computer-usable or computer-readable storage medium having computer-usable or computer-readable program code embodied in the medium for use by or in connection with an instruction execution system. In the context of this document, a non-transitory computer-usable or computer-readable medium may be any medium that can contain, store, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

Computer program code for carrying out operations of data processing systems discussed herein may be written in a high-level programming language, such as C, C++, C#, or Java, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

It should also be noted that in some alternate implementations, the functions/acts noted in the blocks/operations may occur out of the order noted in the flowcharts. For example, two blocks/operations shown in succession may in fact be executed substantially concurrently or the blocks/operations may sometimes be executed in the reverse order, depending upon the functionality/acts involved. Moreover, the functionality of a given block/operation of the flowcharts and/or block diagrams may be separated into multiple blocks/operations and/or the functionality of two or more blocks/operations of the flowcharts and/or block diagrams may be at least partially integrated.

FIG. 1 is a block diagram illustrating an example computer device 100 for executing a computer game according to some embodiments of the present inventive concepts.

Referring to FIG. 1, a computer device 100 may include a central processing unit (CPU) 101 and a main memory unit 122. A computer device 100 may also include an input circuit 113 and an output circuit 114.

The output circuit 114 may provide the computer device 100 with a mechanism of communicating with output devices connected to the computer device 100. Output devices can include, for example, a display device 124. Similarly, additional output devices 123 such as, for example, video displays, speakers, inkjet printers, laser printers, and dye-sublimation printers, among others, may be connected to the output circuit without deviating from the present inventive concepts.

In some embodiments, the computer device 100 may comprise or be connected to multiple display devices 124, which each may be of the same or different type and/or form. As such, the output circuit 114 may comprise any type and/or form of suitable hardware, software, or combination of hardware and software to support, enable, or provide for the connection and use of multiple display devices 124 by the computer device 100. For example, the computer device 100 may include any type and/or form of video adapter, video card, driver, and/or library to interface, communicate, connect or otherwise use the display devices 124. In some embodiments, a video adapter may comprise multiple connectors to interface to multiple display devices 124. In some other embodiments, the computer device 100 may include multiple video adapters, with each video adapter connected to one or more of the display devices 124. In some embodiments, any portion of the operating system of the computer device 100 may be configured for using multiple displays 124. In some embodiments, one or more of the display devices 124 may be provided by one or more other computer devices connected to the computer device 100, for example, via a network. Such embodiments may include any type of software designed and constructed to use another computer's display device as a second display device 124 for the computer device 100. One ordinarily skilled in the art will recognize and appreciate the various ways and embodiments that a computer device 100 may be configured to have multiple display devices 124.

The input circuit 113 may provide the computer device 100 with input from users via various input devices. In some embodiments, the input devices can include, but are not limited to a keyboard 126, and/or a pointing device 127, such as a mouse and/or pen. In some embodiments, an input device can include a touchscreen element integrated with, for example, the display device 124. A computer device 100 may also include additional optional elements, such as one or more input devices (generally referred to using reference numeral 130), in communication with the CPU 101. Examples of additional input devices include, but are not limited to, trackpads, trackballs, drawing pads, visual eye tracking devices, buttons or controllers, voice input devices such as microphones, etc.

The CPU 101 may be any logic circuitry that responds to and processes instructions. In some embodiments, the CPU 101 may be referred to as a processor. In some embodiments, the instructions may be fetched from the main memory unit 122 and/or storage 120. In many embodiments, the CPU 101 is provided by a microprocessor unit, such as: those manufactured by Intel Corporation of Mountain View, Calif.; those manufactured by Motorola Corporation of Schaumburg, Ill.; the POWER processor, those manufactured by International Business Machines of White Plains, N.Y.; and/or those manufactured by Advanced Micro Devices of Sunnyvale, Calif. In some embodiments, the CPU may be the microprocessor of a smartphone device, such as: those manufactured by Apple Corporation of Cupertino, Calif.; those manufactured by Intel Corporation of Mountain View, Calif.; those manufactured by Qualcomm, Inc. of San Diego, Calif.; and/or those manufactured by Samsung Corporation of Seoul, South Korea. The computer device 100 may be based on any of these processors, and/or any other processor capable of operating as described herein.

Main memory unit 122 may be one or more memory chips capable of storing data and allowing any storage location to be directly accessed by the CPU 101, such as Static Random Access Memory (SRAM), Burst SRAM or SynchBurst SRAM (BSRAM), Dynamic Random Access Memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM), among others. The main memory 122 may be based on any of the above described memory chips, or any other available memory chips capable of operating as described herein. In some embodiments, the CPU 101 may communicate with main memory 122 via a system bus 150. In some embodiments of a computer device 100, the CPU 101 may communicate directly with main memory 122 via a specialized memory bus (not shown).

Furthermore, the computer device 100 may include a network interface 118 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., ISDN, Frame Relay, ATM), wireless connections (e.g., IEEE 802.11), or some combination of any or all of the above. The network interface 118 may comprise a built-in network adapter, network interface card, Personal Computer Memory Card International Association (PCMCIA) network card, card bus network adapter, wireless network adapter, Universal Serial Bus (USB) network adapter, modem, or any other device suitable for interfacing the computer device 100 to any type of network capable of communication and performing the operations described herein. In some embodiments, the network interface 118 may be a radio interface of a smartphone.

The storage device 120 may include, for example, a solid-state drive (SSD), a hard disk drive (HDD), and/or a compact disk read-only memory (CD-ROM).

In some embodiments, the computer device 100 can be any workstation, desktop computer, laptop, or notebook computer, server, handheld computer, mobile telephone, any other computer, or other form of computing or telecommunications device that is capable of communication and that has sufficient processor power and memory capacity to perform the operations described herein.

Figure 2:
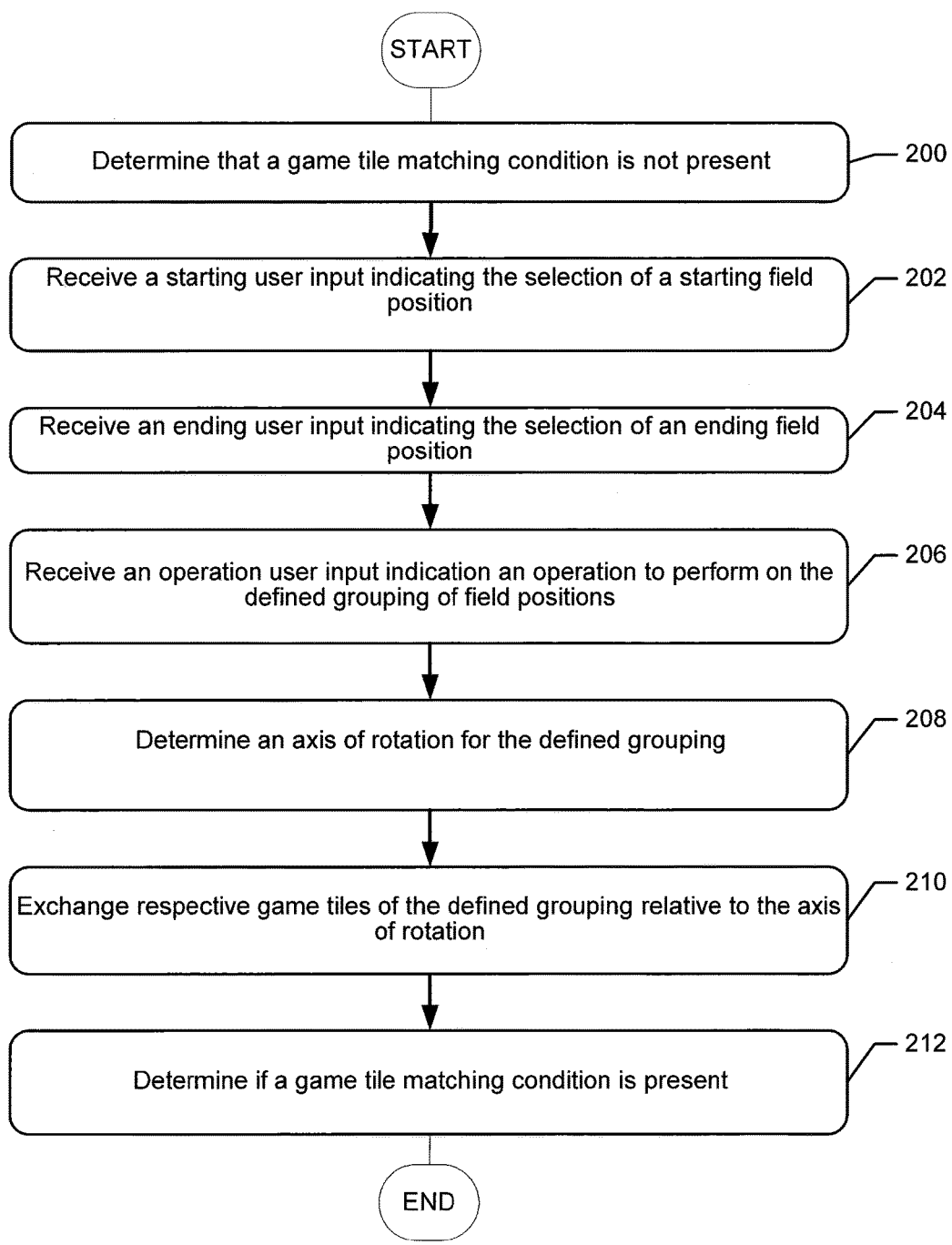
FIG. 2 is a block diagram illustrating methods for providing a game mechanic for an electronic game using one or more computer devices as discussed above according to some embodiments of the present inventive concepts.

FIG. 2 is a block diagram illustrating methods for providing a game mechanic for an electronic game using one or more computer devices 100 as discussed above according to some embodiments of the present inventive concepts. In some embodiments, the operations of FIG. 2 may be executed by computer device 100 as illustrated in FIG. 1. More specifically, in some embodiments the method operations of FIG. 2 may be executed by the CPU 101 of the computer device 100 illustrated in FIG. 1.

Referring to FIG. 2, a first operation 200 of methods corresponding to some embodiments of the game mechanic of the present inventive concepts can include determining that a game tile matching condition is not present in the game tiles of a game field. In some embodiments, the game tile matching condition may comprise a configuration of game tiles in which at least three game tiles of a same category are adjacent one another. In some embodiments, a game tile matching condition may include at least three game tiles adjacent one another in a vertical column and/or horizontal row.

In operation 202 according to some embodiments of the present inventive concepts, the computer device 100 may receive a starting user input from a user of the computer device 100 indicating the selection of a starting field position on the game field.

In operation 204 according to some embodiments of the present inventive concepts, the computer device 100 may receive an ending user input from the user of the computer device 100 indicating the selection of an ending field position on the game field. The starting user input and the ending user input may define a group of at least three game tiles in field positions on the game field between the starting field position and the ending field position. The grouping of tiles may be a vertical, horizontal, or diagonal collection of field positions. In some embodiments, the grouping may be a two-dimensional grouping including multiple rows and multiple columns. In some embodiments, the grouping may be a single dimension. For example, the grouping may correspond to a column or row.

In operation 206 according to some embodiments of the present inventive concepts, the computer device 100 may optionally receive an operation user input from a user of the computer device 100 indicating an operation to perform on the defined grouping of tiles.

In operation 208 according to some embodiments of the present inventive concepts, the computer device 100 may determine a point of rotation for the defined grouping of tiles. In some embodiments, this point of rotation may be at a midpoint of the defined grouping of tiles.

In operation 210 according to some embodiments of the present inventive concepts, the computer device 100 may exchange respective game tiles of the defined grouping of tiles relative to the point of rotation. In some embodiments, this operation may include symmetrically exchanging tiles relative to the point of rotation. In some embodiments, the computer device 100 can display the game tiles on the game field in their newly-exchanged positions. In some embodiments, the computer device 100 can display a transition of the game tiles from their starting position to their ending position. For example, the displayed transition can include rotating the tiles to their new position, shifting of the tiles from their starting position to their ending position, fading the game tiles from their starting position followed by fading the game tiles in to their new ending position, and individually, serially swapping tiles from their starting position to their ending position. Other transitions, and/or types thereof, are within the scope and spirit of the present inventive concepts.

In operation 212 according to some embodiments of the present inventive concepts, the computer device 100 may determine, based on the exchanged tiles, whether a game tile matching condition is now present on the game field.

Figure 3:
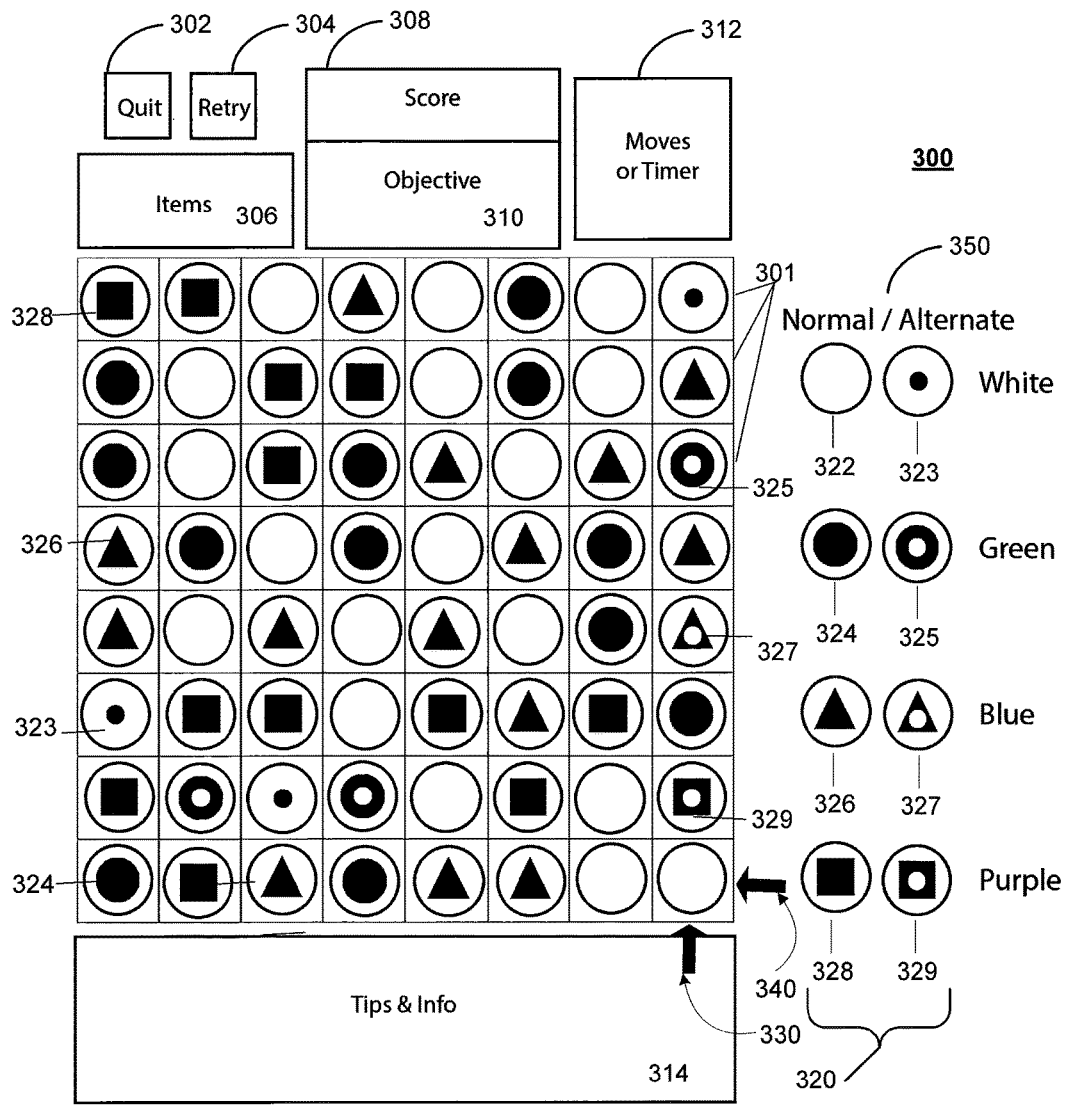
FIG. 3 is an example output game field displayed by an output circuit of an example computer device as illustrated in FIG. 1 in preparation for executing a game mechanic according to some embodiments of the present inventive concepts.

FIG. 3 is an example output game field 300 displayed by an output circuit 114 of an example computer device 100 as illustrated in FIG. 1 in preparation for executing a game mechanic according to some embodiments of the present inventive concepts.

Referring to FIG. 3, a game field 300 is illustrated, which may include a number of interface elements and field positions 301. The interface elements may include a quit element 302, a retry element 304, a game items element 306, a score element 308, an objective element 310, a move and/or timer element 312, and/or an information element 314. The respective interface elements may be displayed within the game field as various user interface elements, including buttons, check boxes, and/or text boxes, though the present inventive concepts are not limited thereto.

The field positions 301 may be organized as a series of positions which may contain game tiles 320. In some embodiments, the field positions 301 may be organized in a series of rows 340 and columns 330. Though illustrated as a square including an equal number of rows 340 and columns 330 in FIG. 3, it will be understood that other shapes are possible. For example, some embodiments may include an organization of rows 340 and columns 330 into a rectangle shape, a triangle shape, a circle shape, . . . or a polygon shape. In some embodiments, the organization of rows 340 and columns 330 may include rows 340 and/or columns 330 having different quantities of field positions 301.

Similarly, though the individual field positions 301 are illustrated as squares, the shape of the field positions 301 are not limited thereto. For example, some embodiments may include field positions 301 represented in the shape of a rectangle, a triangle, a circle, . . . and/or a polygon.

The field positions 301 may contain a game tile 320. The game tiles 320 may be organized into different categories. The categories may be differentiated from one another in multiple ways. For example, in some embodiments, the game tiles 320 may be organized by color. In some embodiments, the game tiles 320 may be organized by shape. As disclosed herein, there are multiple ways to categorize the game tiles 320 within the present inventive concepts. For example, the game tiles 320 may be categorized by texture and/or symbol. In some embodiments, the game tiles 320 may be categorized by combinations of color, shape, texture, and/or symbol. In some embodiments, the game tiles 320 may be referred to as sigils.

In a match-three game, the category with which a given game tile 320 is associated may determine whether a matching condition is present. As discussed, a matching condition may be present when three or more game tiles 320 of a given category are adjacent one another. In some embodiments, game tiles 320 may be members of multiple categories simultaneously. In other words, a game tile 320 may be a member of more than one category for purposes of determining a match. As an example, in some embodiments a game tile 320 may be a "wild" game tile 320 such that it can be used to match against adjacent game tiles 320 of any category. In some embodiments, such a "wild" game tile 320 may match against adjacent game tiles 320 of more than one category simultaneously. For example, such a "wild" game tile 320 may be considered a match for two adjacent game tiles 320 of a first category while simultaneously being a match for two adjacent game tiles 320 of a second category.

FIG. 3 illustrates a key 350 to assist in interpretation of the categories of the game tiles 320 utilized in the game field 300. The key illustrates four primary categories (e.g. WHITE, GREEN, BLUE, PURPLE) of the game tiles 320. As described herein, though the categories are primarily distinguished in the key 350 by color, other differentiations, such as shape, size, texture, etc., are possible. It will be further understood that though the key 350 is illustrated herein for assistance with interpretations of the categories, such a key 350 may not be included as part of the game field 300. In some embodiments, the key 350 may be made selectively visible by gesture or other user input provided by the user.

As illustrated in the key 350, the game tiles 320 may include a normal representation and an alternate representation. The alternate representation may indicate that a particular game tile 320 is part of a given category (e.g. WHITE), but has additional attributes. For example, a game tile 320 which is represented in its alternate representation may still be a match for other game tiles 320 of the category in a normal representation, but may indicate that other operations may be performed if the game tile 320 having the alternate representation is involved in a match. For example, three adjacent game tiles 320 may all be of a single category (e.g. WHITE). In some embodiments, if all three game tiles 320 are of a normal representation (e.g. normal WHITE), then a standard match may result in all three game tiles 320 being removed from the game field 300. However, in some embodiments, if one of the game tiles 320 includes an alternate representation (e.g. alternate WHITE), then a match may result in additional action being performed, such as additional scoring, additional effects, or other special actions.

The key 350 includes, as an example, the categories WHITE, GREEN, BLUE, and PURPLE. Within these categories, some embodiments may include a normal WHITE game tile 322, an alternate WHITE tile 323, a normal GREEN tile 324, an alternate GREEN tile 325, a normal BLUE tile 326, an alternate BLUE tile 327, a normal PURPLE tile 328, and an alternate PURPLE tile 329.

FIG. 3 also illustrates the example game tiles 320 as placed in an example game field 300 at random field positions 301. As illustrated in FIG. 3, the example positioning of the game tiles 320 in the game field 300 may not generate a matching condition. In other words, the configuration of game tiles 320 illustrated in FIG. 3 may not include any combination of at least three tiles of the same category adjacent one another.

As described herein, the game field 300 may include other example elements. Though certain example elements are described herein, these elements are optional, and thus none of these additional elements are required for embodiments of the present inventive concepts.

For example, the game field 300 may include a quit element 302, which allows the user to suspend and/or end game play. In some embodiments, the game field 300 may include a retry element 304 which may allow the user to begin a particular round of play again. The score element 308 which may display a score associated with the current round of play. The objective element 310 may display an objective associated with the current round of play, such as a goal to be achieved by the user. The move and/or timer element 312 may display the number of moves taken by the user and/or the amount of time that has elapsed in the current round of play. In some embodiments, the move and/or timer element 312 may also display the number of moves remaining in the current round of play and/or the amount of time that has remains in the current round of play. The information element 314 may display additional information for the user of the game, such as tips regarding gameplay or other information that may assist the user.

In will be understood that while FIG. 3 illustrates a particular configuration of the elements and field positions 301 of the game field 300, other configurations are possible without deviating from the present inventive concepts.

Figure 4:
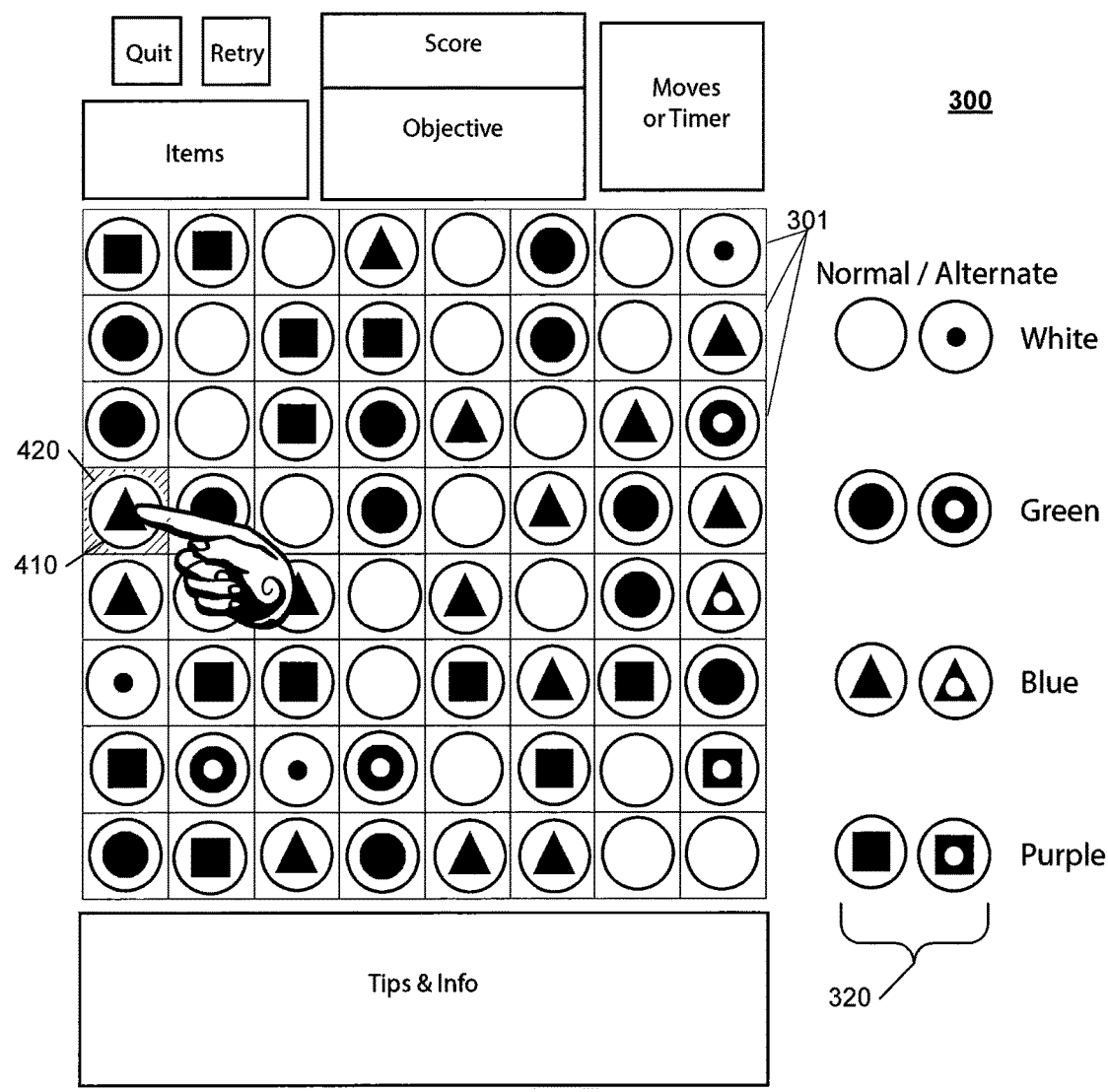
FIG. 4 illustrates the game field of FIG. 3, further illustrating an example selection of a starting field position in accordance with some embodiments of the present inventive concepts.

FIG. 4 illustrates the game field 300 of FIG. 3, further illustrating an example selection of a starting field position 410 in accordance with some embodiments of the present inventive concepts.

Referring to FIG. 4, the user may select a starting field position 410 from among the field positions 301 of the game field 300. The user may select the starting field position 410 via any input method consistent with the platform software and/or hardware upon which the game field 300 is displayed. For example, the user may indicate the starting field position 410 by clicking on the corresponding field position with a mouse (e.g. the pointing device 127 of the computer device 100 of FIG. 1). In some embodiments, such as those incorporating a computer device 100 with a touchscreen, a user may indicate the starting field position 410 by touching the screen of the computer device 100. Some other embodiments provide additional input methods that are consistent with the present inventive concepts without deviating from the inventive concepts discussed herein. In some embodiments, the user may indicate the starting field position 410 by selecting (e.g., clicking on or touching) the game tile 320 itself. In some embodiments, the user may indicate the starting field position 410 by selecting the field position 301.

In some embodiments, once the starting field position 410 is selected the starting field position 410 may be indicated graphically. For example, in FIG. 4, the starting field position 410 is illustrated with a selection mark 420. It will be recognized that multiple ways of indicating the selected field positions 301 are possible within the present inventive concepts. Though FIG. 4 illustrates the starting field position 410 as being highlighted by a selection mark 420, some other embodiments provide that such highlighting is optional, and thus is not required by the present inventive concepts.

Figure 5:
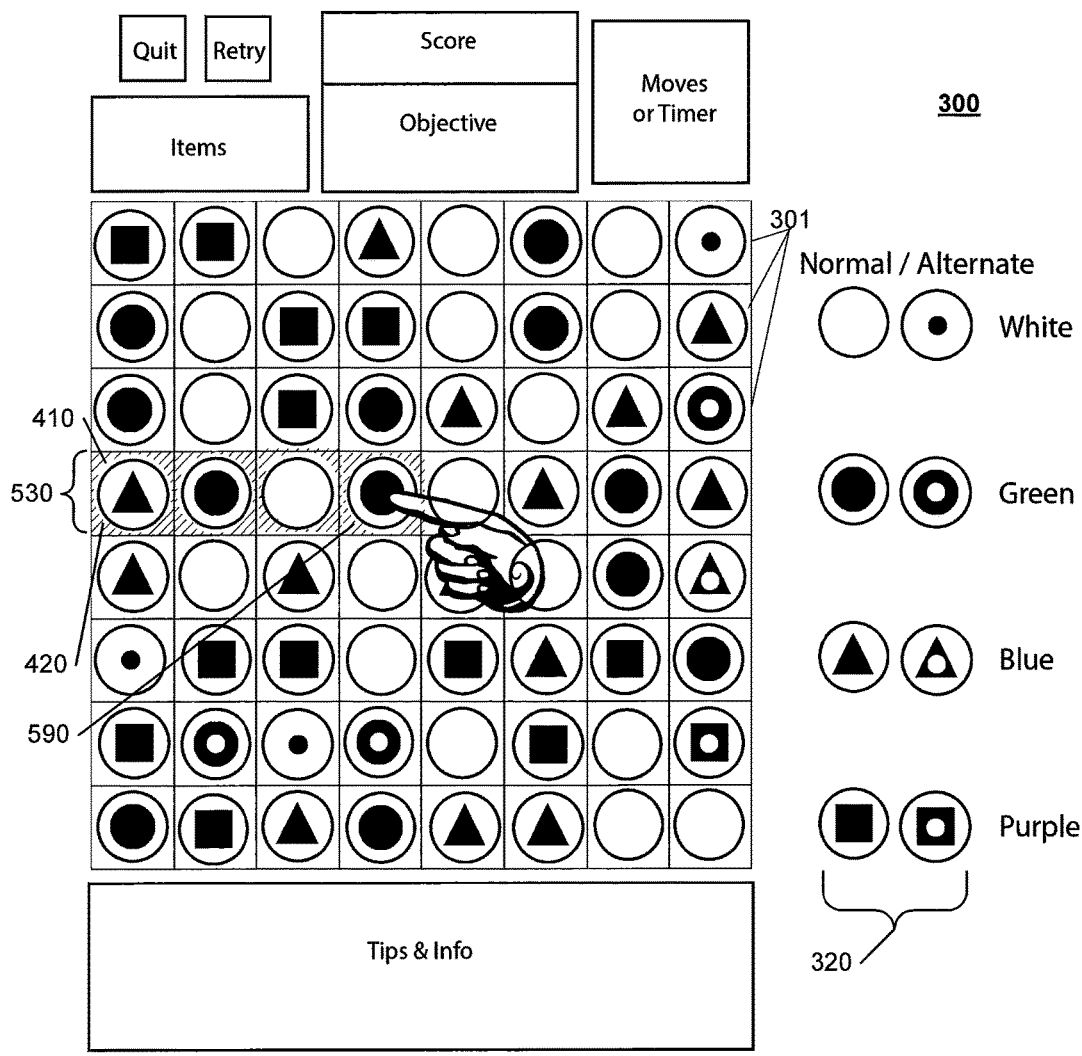
FIG. 5 illustrates the game field of FIG. 4, further illustrating an example selection of an ending field position in accordance with some embodiments of the present inventive concepts.

FIG. 5 illustrates the game field 300 of FIG. 4, further illustrating an example selection of an ending field position 590 in accordance with some embodiments of the present inventive concepts.

Referring to FIG. 5, the user may select an ending field position 590 from among the field positions 301 of the game field 300. The user may select the ending field position 590 via a similar input method to that used to select the starting field position 410 (FIG. 4). For example, in some embodiments, the user may indicate the ending field position 590 by selecting (e.g., clicking on or touching) the game tile 320 itself. In some embodiments, the user may indicate the ending field position 590 by selecting the field position 301.

When the user selects the ending field position 590 within the game field 300, the computer device 100 may determine a grouping 530 of game tiles 320 between the starting field position 410 and the ending field position 590. For example, as illustrated in FIG. 5, the starting field position 410 and the ending field position 590 may indicate a grouping 530 of four game tiles 320 in a row.

The computer device 100 may indicate the grouping 530 of game tiles 320 by multiple methods. For example, the grouping 530 of game tiles 320 may be indicated by associating a selection mark 420 with the starting field position 410, the ending field position 590, and each of the other field positions 301 associated with the defined grouping 530 of game tiles 320. For example, as illustrated in FIG. 5, each of the four game tiles 320 in the defined grouping 530 of game tiles 320 may be indicated with the selection mark 420.

In some embodiments, the computer device 100 may place the game field 300 into a selection mode once the starting field position 410 is selected. In this selection mode, the computer device 100 may cause respective field positions 301 of the game field 300 to be highlighted with the selection mark 420 as the user moves an input device such as the pointing device 127 (FIG. 1) across the game field 300. In other words, as the user moves the input device, the computer device 100 may cause the game field 300 to continuously and automatically indicate a grouping 530 of game tiles 320 that would be defined if the user were to select a given game tile 320 as the ending field position 590. In this way, the computer device 100 may assist the user in visualizing the defined grouping 530 of game tiles 320 which would result from a particular selection of ending field position 590.

Figure 6:
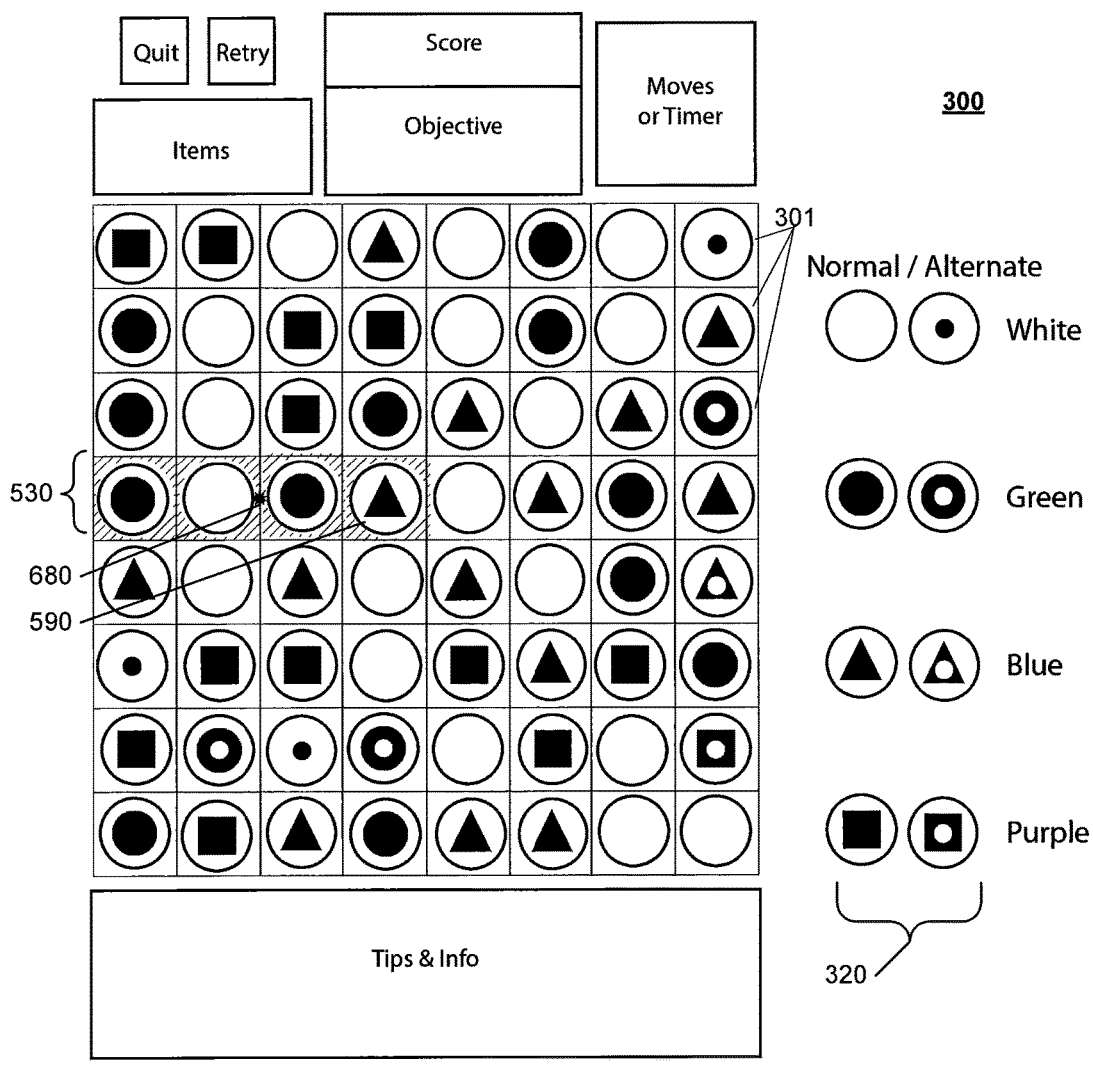
FIG. 6 illustrates the game field of FIG. 5, further illustrating a transformed grouping of game tiles in accordance with some embodiments of the present inventive concepts.

FIG. 6 illustrates the game field 300 of FIG. 5, further illustrating a transformed grouping 530 of game tiles 320 in accordance with some embodiments of the present inventive concepts.

Once the defined grouping 530 of game tiles 320 has been selected, the computer device 100 may cause the defined grouping 530 of game tiles 320 to be transformed. In some embodiments, this transformation may be performed automatically upon the selection of the ending field position 590. In some embodiments, the computer device 100 may wait for additional input from the user, such as input via the input circuit 113 (FIG. 1) before performing the transformation.

The transformation may involve swapping the game tiles 320 about a point of rotation 680 represented by a midpoint of the defined grouping 530 of the game tiles 320. In such a transformation, the game tile 320 in the starting field position 410 may be swapped with the game tile 320 in the ending field position 590. The game tile 320 in the field position within the defined grouping 530 and adjacent the starting field position 410 may be swapped with the game tile 320 within the defined grouping 530 and adjacent the ending field position 590, and so on. Each game tile 320 of the defined grouping 530 may be swapped with a respective game tile 320 of the defined grouping 530 at a symmetrical position across a midpoint of the defined grouping 530. In some embodiments, this midpoint may be referred to as a point of rotation 680, as the transformation of the game tiles 320 may be the result of a rotation of the game tiles 320 of the defined grouping 530 about this midpoint. For a given row of N elements, each occupying positions 0 through N−1 of an array, the transformation of the $i^{th}$ element from its initial position, denoted i, to its transformed position, denoted i', can be written as i'=(N−1)−i. For example, in an array of four elements (N=4), the first element (position 0, i=0) will move to the fourth element's location (position 3, i'=3). The second element (position 1) will move to third element's location (position 2). The third element (position 2) will move to second element's location (position 1). The fourth element (position 3) will move to first element's location (position 0).

Once the computer device 100 has determined the new field positions 301 for each of the game tiles 320 in the defined grouping 530, the computer device 100 can control the output circuit 114 (FIG. 1) to display the game tiles 320 in their new field positions 301 on the game field 300. Once in their new field positions 301, the computer device 100 may again determine whether there is a matching condition on the game field 300.

Figure 7:
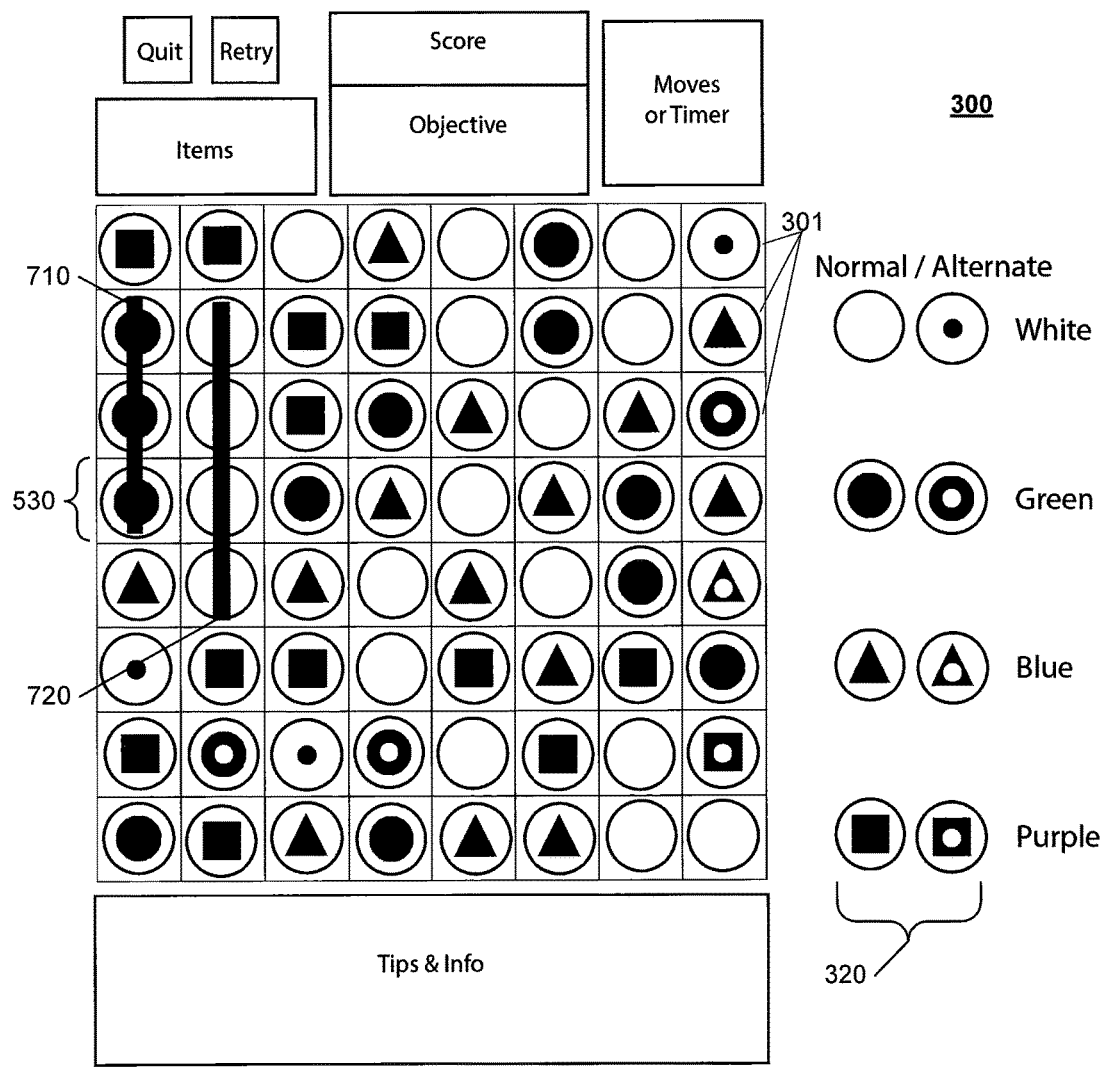
FIG. 7 illustrates the game field of FIG. 6, further illustrating the determination of a game tile matching condition in accordance with some embodiments of the present inventive concepts.

FIG. 7 illustrates the game field 300 of FIG. 6, further illustrating the determination of a game tile matching condition in accordance with some embodiments of the present inventive concepts.

As illustrated in FIG. 7, the new field positions 301 of the transformed grouping 530 of game tiles 320 may result in a game tile matching condition being present. As described herein, a matching condition may be present when three or more game tiles 320 of a given category are adjacent one, such as in a horizontal and/or vertical direction. Referring to FIG. 7, two matching conditions are illustrated, denoted by reference numbers 710 and 720. Matching condition 710 shows an example matching condition of three vertical tiles of the same category, exemplified here as "GREEN." Matching condition 720 shows an example matching condition of four vertical tiles of the same category, exemplified here as "WHITE."

Figure 8:
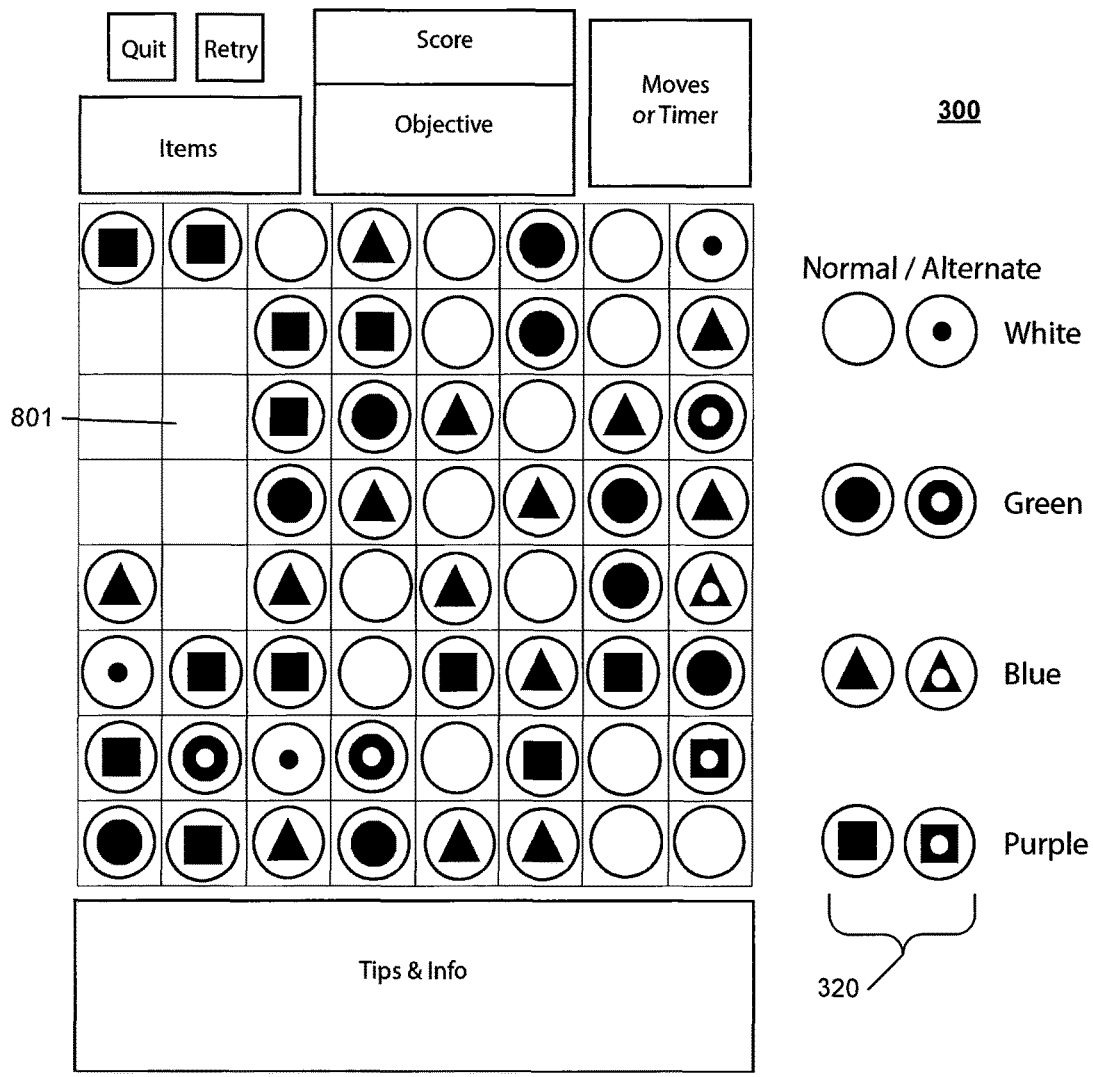
FIG. 8 illustrates the game field of FIG. 7, further illustrating the removal of matching game tiles in accordance with some embodiments of the present inventive concepts.

FIG. 8 illustrates the game field 300 of FIG. 7, further illustrating the removal of matching game tiles 320 in accordance with some embodiments of the present inventive concepts.

Referring to FIG. 8, responsive to the identification of the matching conditions 710 and 720 of FIG. 7, the computer device 100 may cause the game tiles 320 which are associated with the matching condition to be removed, leaving empty field positions 801.

The computer device 100 may remove the game tiles 320 from the game field 300 using a number of different graphical effects. For example, in some embodiments, the game tiles 320 may disappear and/or fade out over a given time period. In some embodiments, the game tiles 320 may graphically explode and/or fly off the game field 300. Some embodiments provide that other graphical representations of the removal of game tiles 320 are possible without deviating from the scope and spirit of the present inventive concepts.

It will be understood that though FIG. 8 illustrates only those game tiles 320 which are a part of the matching conditions 710 and 720 of FIG. 7 being removed, other outcomes are possible. For example, attributes of the matching conditions 710 and 720 (such as, for example, the inclusion of a game tile 320 of an alternate category) may cause additional game tiles 320, such as game tiles 320 in the vicinity of the matching conditions 710 and 720 to be additionally removed.

Figure 9:
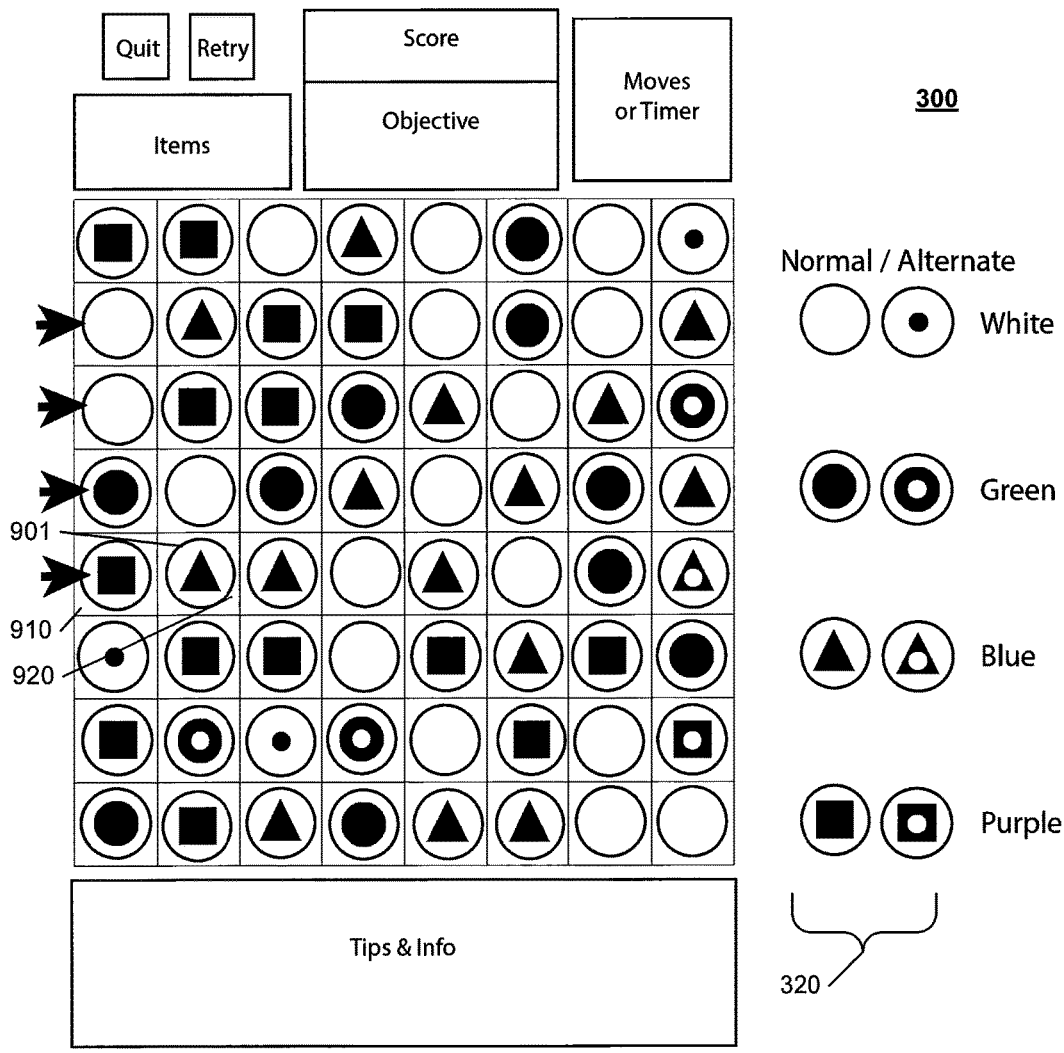
FIG. 9 illustrates the game field of FIG. 8, further illustrating the replacement of removed game tiles in accordance with some embodiments of the present inventive concepts.

FIG. 9 illustrates the game field 300 of FIG. 8, further illustrating the replacement of removed game tiles 320 in accordance with some embodiments of the present inventive concepts.

Responsive to the removal of the game tiles 320, the computer device 100 may cause the empty field positions 301 of the game field 300 to be refilled with game tiles 320. In some embodiments, this replacement may be accomplished by shifting in new games tiles 320 from a side of the game field 300. The side of the game field 300 may be any side of the game field 300. For example, in FIG. 9, new games tiles 320 are illustrated as being shifted in from the left side. In some embodiments, there are multiple possibilities for replacing the removed game tiles 320 that remain within the scope and spirit of the present inventive concepts. In some embodiments, the game tiles 320 may be shifted in from the top and/or the bottom of the game field 300. In some embodiments, the side of the game field 300 from which new games tiles 320 shift in may change during the duration of the game.

FIG. 9 also illustrates that game tiles 320, such as game tile 901 noted in FIG. 9, may be adjacent empty field positions 301 as a result of the removal of matching game tiles 320 as illustrated in FIG. 8. These adjacent game tiles 901 may be serially shifted from their original position, such as position 910, into the empty field positions, such as position 920, to fill in the game field 300. The shifting of these adjacent game tiles 901 may itself result in original field positions 910 being empty. This empty field position may then be replaced with a new game tile 320 as described above.

Figure 10A:
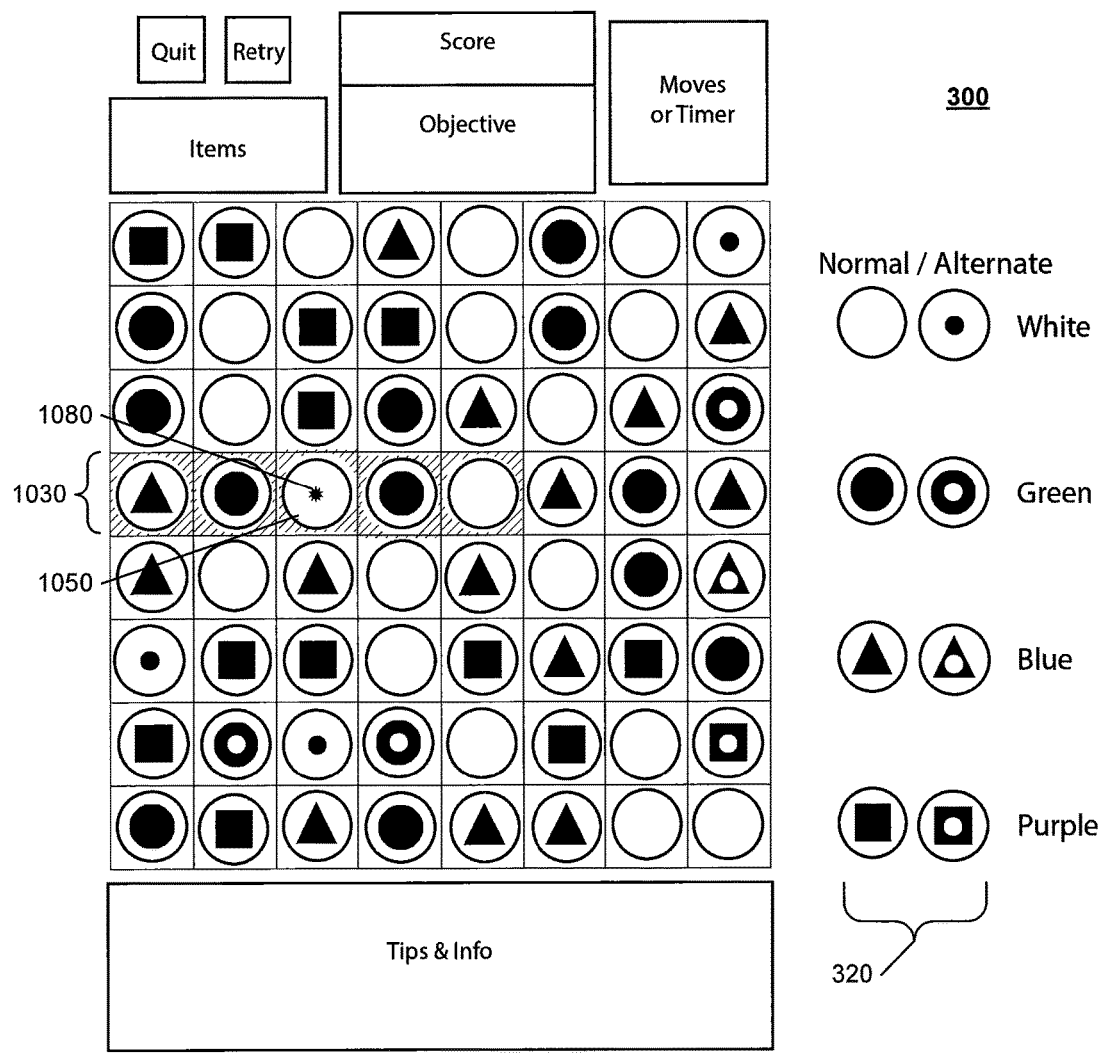
FIGS. 10A and 10B illustrate the game field of FIG. 3, further illustrating the selection and transformation of a horizontal grouping of an odd number of game tiles in accordance with some embodiments of the present inventive concepts.
Figure 10B:
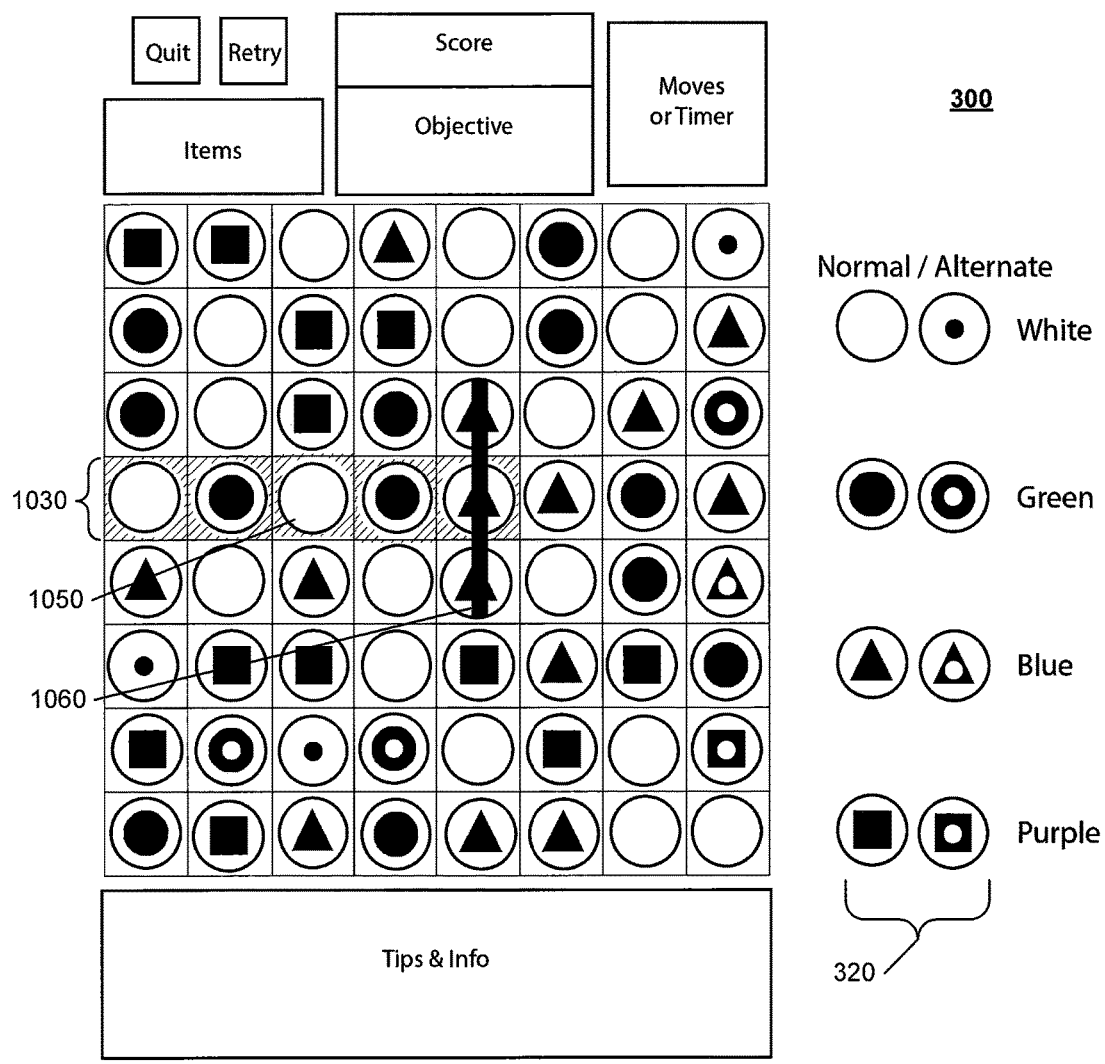

FIGS. 10A and 10B illustrate the game field 300 of FIG. 3, further illustrating the selection and transformation of a horizontal grouping 1030 of an odd number of game tiles 320 in accordance with some embodiments of the present inventive concepts.

Referring to FIG. 10A, a grouping 1030 is illustrated in which the number of game tiles 320 are odd. As described herein, the computer device 100 may determine that a point of rotation 1080 for the grouping 1030, located at a midpoint of the grouping 1030, is located on a particular game tile 1050. As a result, the calculation by the computer device 100 of the new position of the game tile 1050 results in the game tile 1050 remaining at its original position. In other words, using the transformation equation i'=(N−1)−i for an array of 5 elements, the third element (position 2) remains at position 2.

Referring to FIG. 10B, the grouping 1030 of game tiles 320 is illustrated after the transformation is performed by the computer device 100. As illustrated, the game tile 1050 at the midpoint of the grouping 1030 may not change position. The other game tiles 320 in the grouping 1030 may be displayed in their new field positions 301 on the game field 300 as calculated and displayed by the computer device 100. The computer device 100 may also determine that a matching condition, such as the matching condition 1060 illustrated in FIG. 10B, is present as a result of the transformation.

Figure 11A:
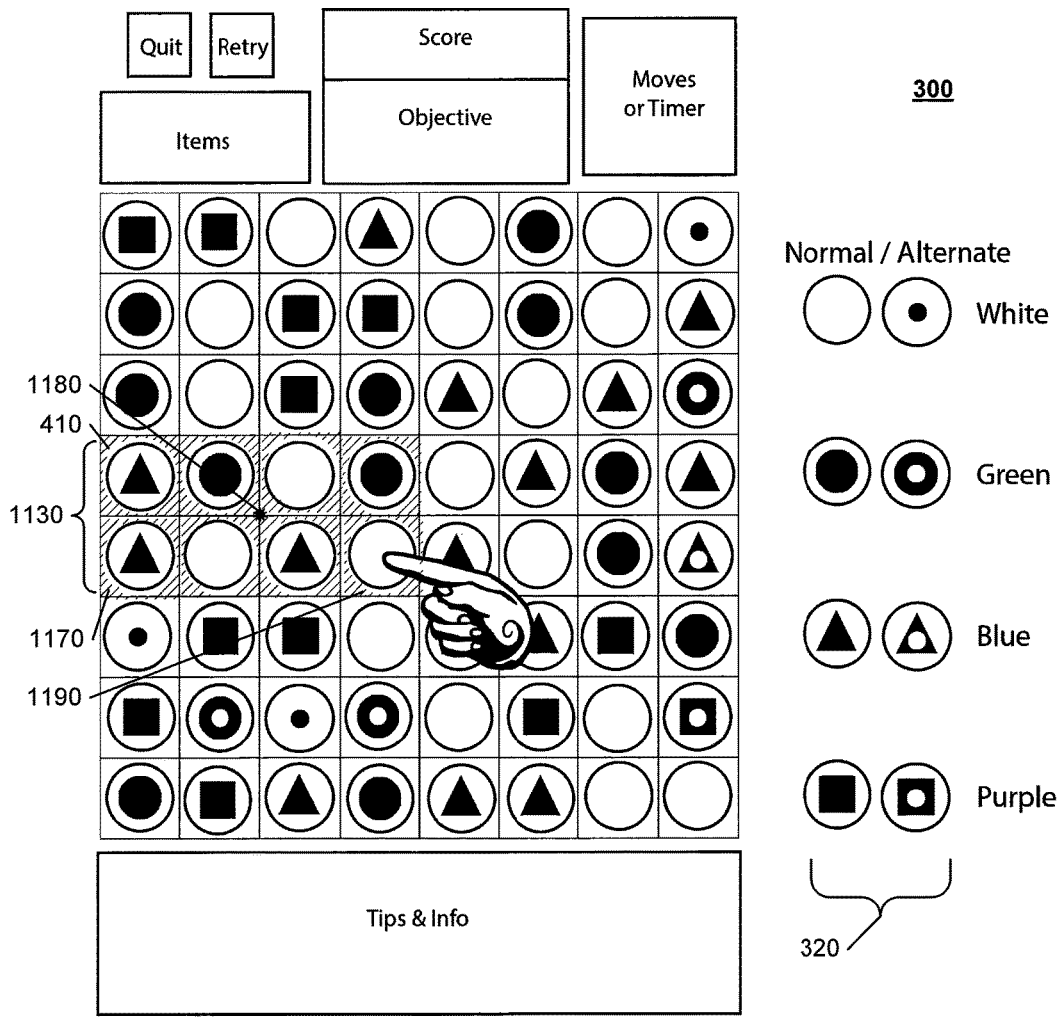
FIGS. 11A and 11B illustrate the game field of FIG. 4, further illustrating the selection and transformation of a horizontal grouping of game tiles comprising multiple columns and rows in accordance with some embodiments of the present inventive concepts.
Figure 11B:
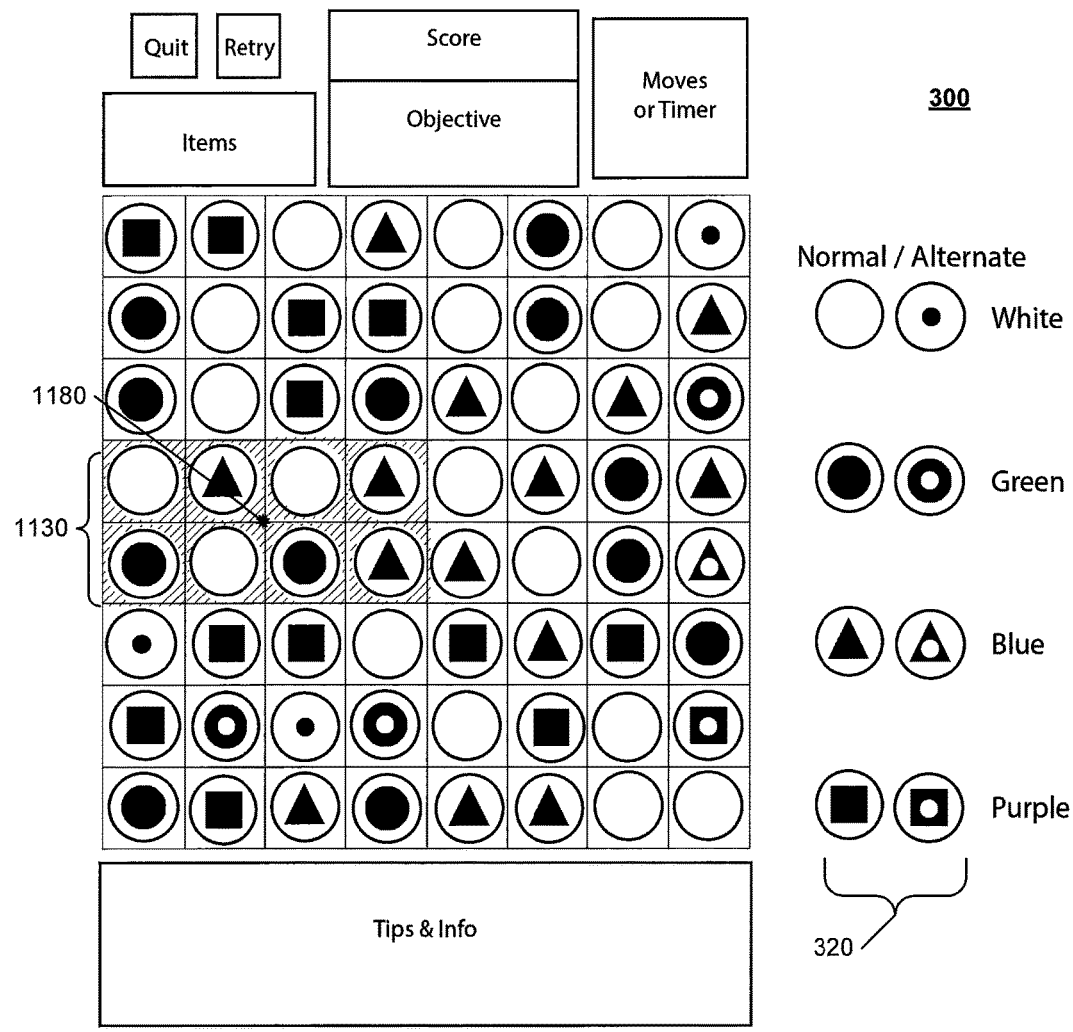

FIGS. 11A and 11B illustrate the game field 300 of FIG. 4, further illustrating the selection and transformation of a horizontal grouping 1130 of game tiles 320 comprising multiple columns and rows in accordance with some embodiments of the present inventive concepts.

Referring to FIG. 11A, the selection of an ending field position 1190, corresponding to the starting field position 410 (FIG. 4) is indicated. As illustrated, the ending field position 1190 may indicate a grouping 1130 of game tiles 320 which comprise more than one row or column. As such, the defined grouping 1130 of game tiles 320 may be two-dimensional.

FIG. 11A illustrates the defined grouping 1130 of game tiles 320 being determined by the selection of a starting field position 410 and an ending field position 1190 which are opposite corners of a two-dimensional array of field positions 301. By determining that the starting field position 410 and the ending field position 1190 are not on the same row, the computer device 100 may automatically determine that a two-dimensional grouping 1130 of game tiles 320 is intended. However, the present inventive concepts are not limited to such a selection mode. For example, in some embodiments, the computer device may require that a special two-dimensional selection mode may be indicated before a two-dimensional grouping 1130 of game tiles 320 may be selected. In some embodiments, the computer device 100 may require that a middle field position 1170 be selected to indicate the contours of the grouping 1130 of game tiles 320. For example, the middle field position 1170 may be a middle vertex of the two-dimensional array between opposite vertices indicated by the starting field position 410 and the ending field position 1190.

Referring to FIG. 11B, the grouping 1130 is illustrated after the transformation is performed by the computer device 100. With a two-dimensional grouping 1130 of game tiles 320, the transformation may include transforming both rows and columns of the grouping 1130 of game tiles 320 about a point of rotation 1180. In other words, with a two-dimensional grouping 1130, a game tile 320 at a given field position 301 may be swapped in both a columnar and a row direction. For example, for a given rectangular array of $N_R$ rows and $N_C$ columns with the point of rotation at the midpoint, the transformation of a given game tile 320 from a location (R,C) to a new location (R',C') may be given by $R'=(N_R-1)-R$ and $C'=(N_C-1)-C$. This equation assumes that the given row addresses go from 0 to $N_R-1$ and the given column addresses go from 0 to $N_C-1$. For example, a defined grouping 1130, such as the one illustrated in FIG. 11A, may include two rows and four columns. In such a two-dimensional array, the transformation from original position to new position may be as illustrated in the following Table 1:

TABLE 1

| Example Transformation | | | |
| --- | --- | --- | --- |
| Original Row | Original Column | New Row | New Column |
| 0 | 0 | 1 | 3 |
| 0 | 1 | 1 | 2 |
| 0 | 2 | 1 | 1 |
| 0 | 3 | 1 | 0 |
| 1 | 0 | 0 | 3 |
| 1 | 1 | 0 | 2 |
| 1 | 2 | 0 | 1 |
| 1 | 3 | 0 | 0 |

The example transformation above exemplifies the transformation of the multidimensional array about the point of rotation 1180 illustrated in FIG. 11A. FIG. 11B illustrates this transformation applied to the game field 300. After transforming the grouping 1130, the computer device 100 may display the transformed grouping 1130 of game tiles 320 at the new field positions 301 in the game field 300.

As described herein, the computer device 100 selects a point of rotation (e.g. 1180), or pivot point, about which to transform the grouping (e.g. 1130) of game tiles 320. However, other transformations are within the scope and spirit of the present inventive concepts. For example, in some embodiments, once the grouping 1130 of game tiles 320 is selected, the computer device 100 may receive additional input from the user via an input device, such as pointing device 127 (FIG. 1). Responsive to this input, the computer device 100 may perform a reflection, rather than a rotation, of the defined grouping (e.g. 1130) of the selected game tiles 320 of the defined grouping 1130. In other words, the computer device may accept a user input indicating an axis of reflection (e.g., a horizontal, vertical, or diagonal axis) and may, responsive to this input, reflect the selected game tiles 320 about this axis. A reflection transformation of this type may result in a first game tile 320 being swapped with a second game tile 320 which is symmetrical to the first game tile 320 across the axis (e.g., a horizontal, vertical, or diagonal) of reflection.

FIG. 11B also illustrates that a given transformation of a grouping 1130 of game tiles 320 is not required to generate a matching condition. As illustrated in FIG. 11B, once the computer device 100 has performed the transformation, the computer device 100 determines whether a matching condition exists on the game field 300. If a matching condition does not exist, as is the case in FIG. 11B, no game tiles 320 are removed and game play may be continued.

FIGS. 12A, 12B, 12C, and 12D illustrate the game field 300 of FIG. 3, further illustrating the selection and transformation of a vertical grouping 1230 of game tiles 320, including vertical groupings 1230' comprising multiple columns and rows, in accordance with some embodiments of the present inventive concepts.

Figure 12A:
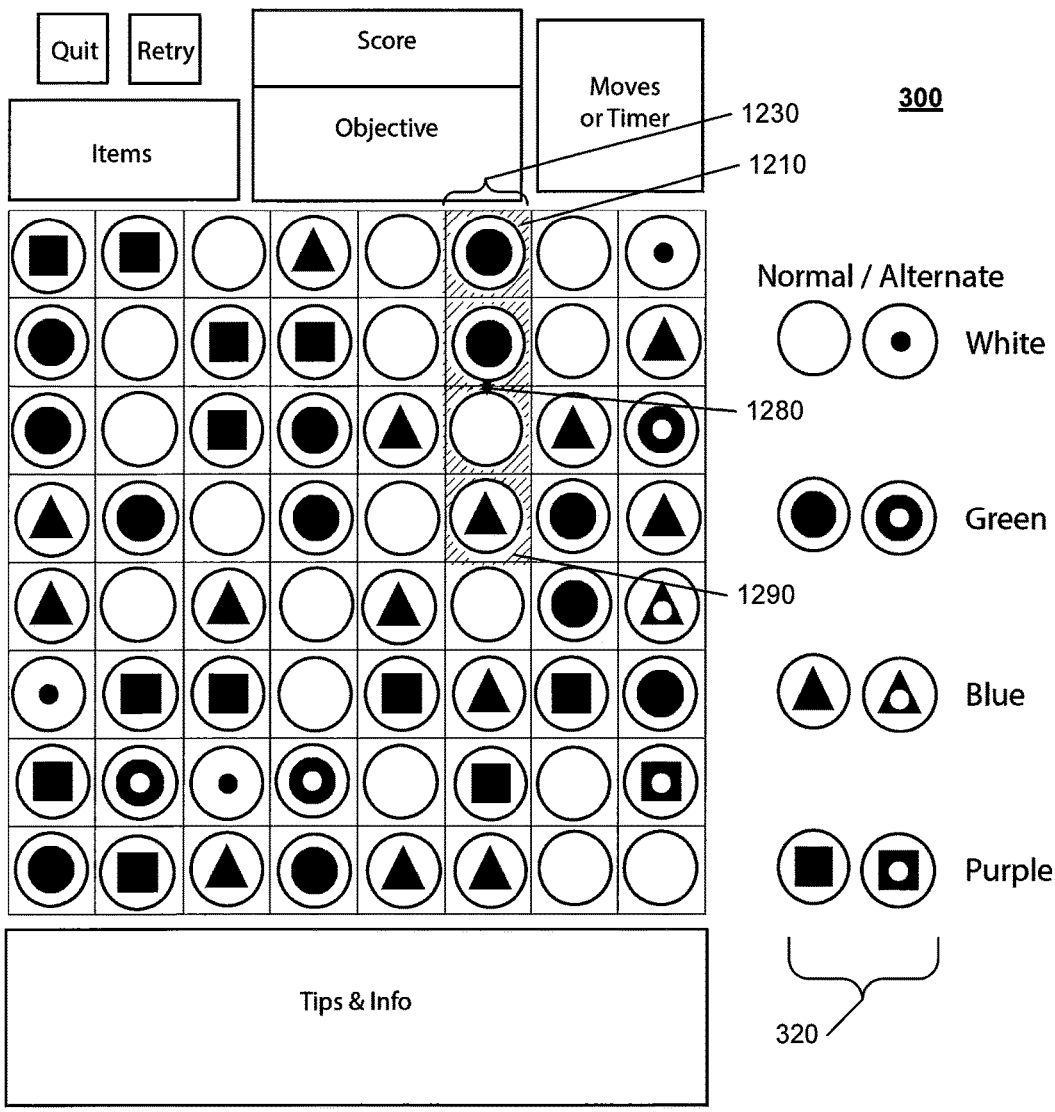
FIGS. 12A, 12B, 12C, and 12D illustrate the game field of FIG. 3, further illustrating the selection and transformation of a vertical grouping of game tiles, including vertical groupings comprising multiple columns and rows, in accordance with some embodiments of the present inventive concepts.

Referring to FIG. 12A, a vertical grouping 1230 is indicated including game tiles 320 between a starting field position 1210 and an ending field position 1290. The starting field position 1210 and the ending field position 1290 may be selected in ways similar or identical to those described herein with respect to horizontal groupings 530 (e.g., FIG. 5).

As illustrated in FIG. 12A, the defined vertical grouping 1230 of game tiles 320 may have a point of rotation 1280 which can be determined by the computer device 100. The computer device 100 may transform the vertical array of the grouping 1230 in ways similar or identical to those described herein with respect to horizontal groupings 530 (e.g., FIG. 6).

Figure 12B:
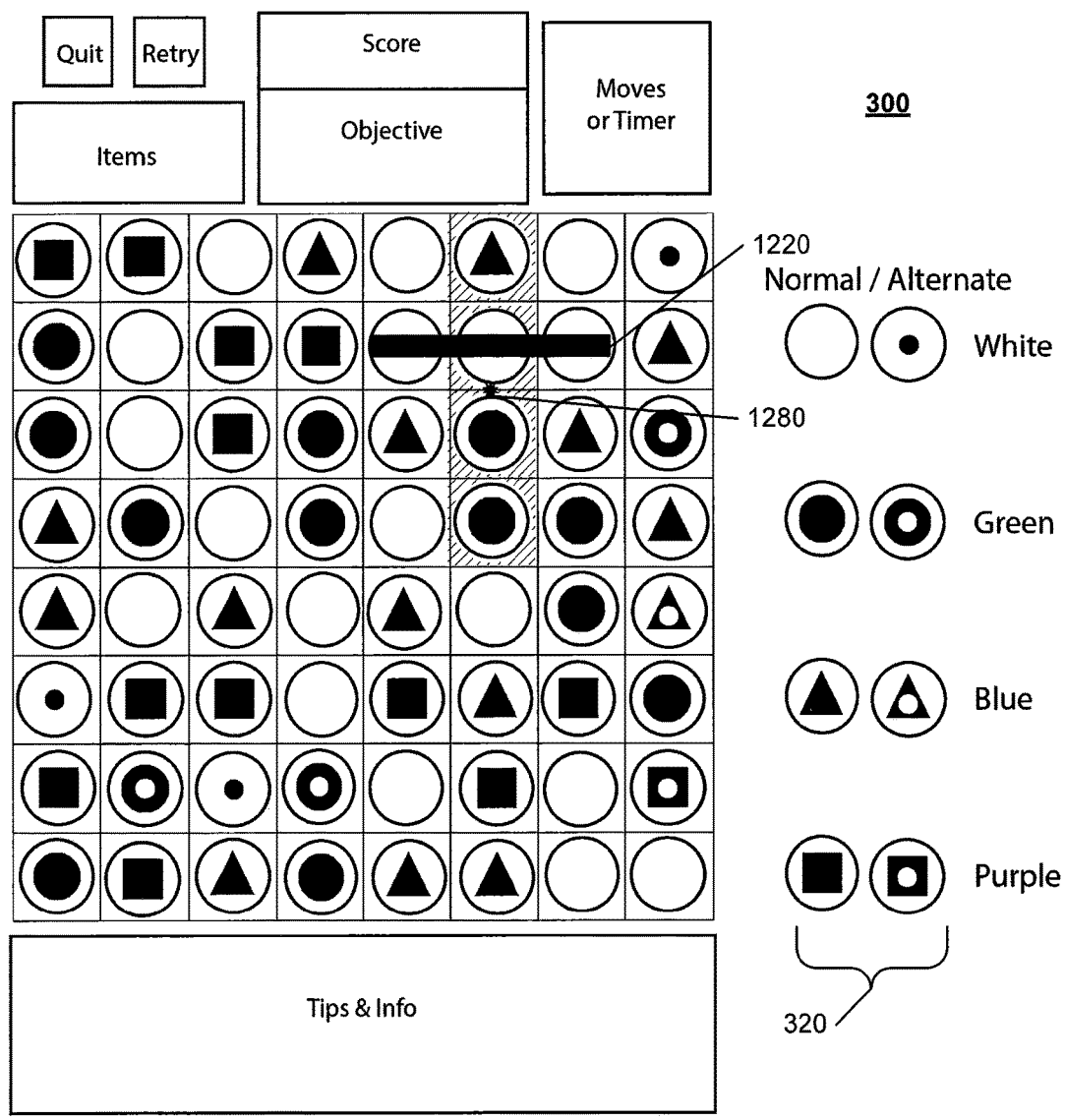

Referring to FIG. 12B, a transformed vertical grouping 1230 of game tiles 320 is displayed on the game field 300, including an identified game matching condition 1220. The matching condition 1220 may be handled in ways similar or identical to those described herein with respect to horizontal groupings 530 (e.g., FIGS. 7 and 8).

Figure 12C:
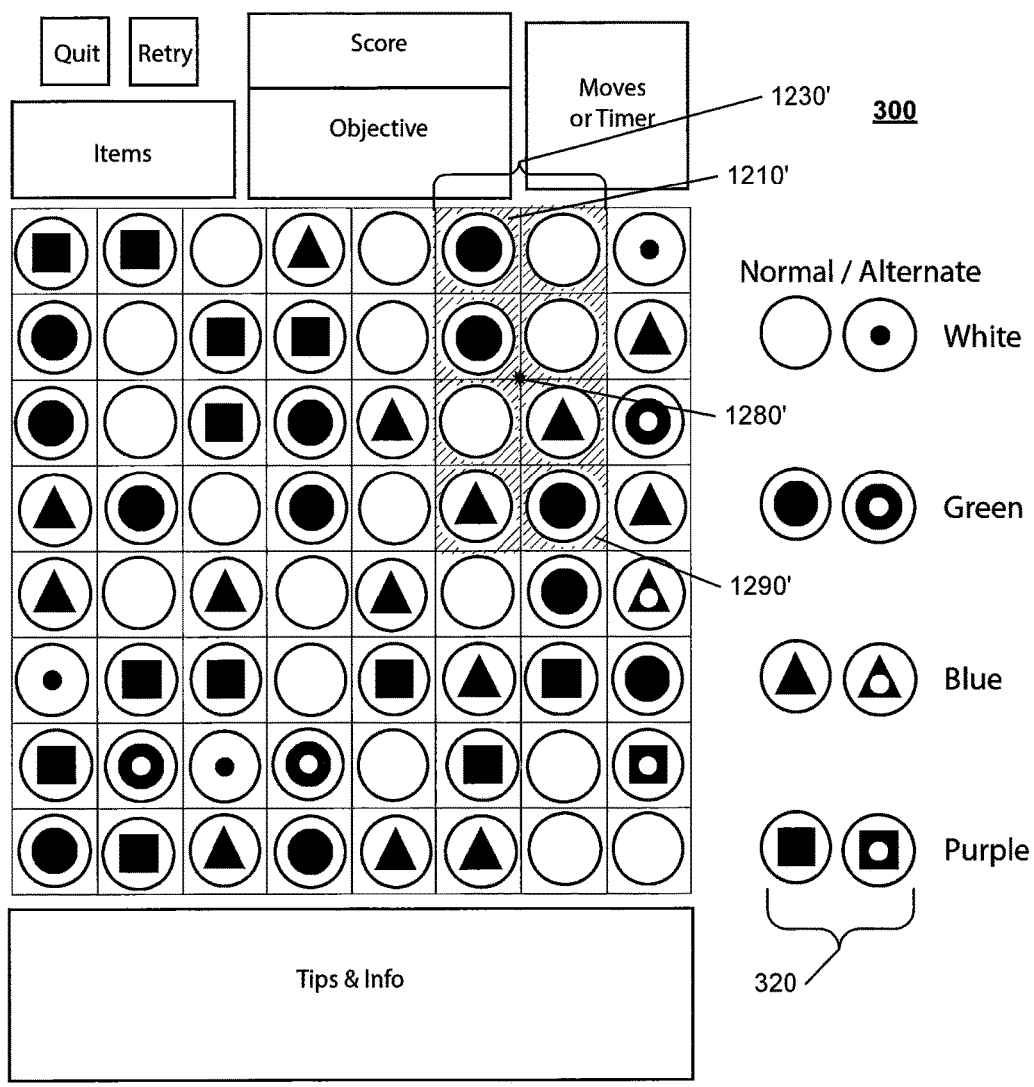

Referring to FIG. 12C, a two-dimensional vertical grouping 1230' of game tiles 320 is indicated including a starting field position 1210' and an ending field position 1290'. The starting field position 1210' and the ending field position 1290' may be selected in ways similar or identical to those described herein with respect to horizontal two-dimensional groupings 1130 (e.g., FIG. 11A).

As illustrated in FIG. 12C, the defined two-dimensional vertical grouping 1230' may have a point of rotation 1280' which can be determined by the computer device 100. The computer device 100 may transform the two-dimensional vertical array of the grouping 1230' in ways similar or identical to those described herein with respect to horizontal two-dimensional groupings 1130 (e.g., FIG. 11B).

Figure 12D:
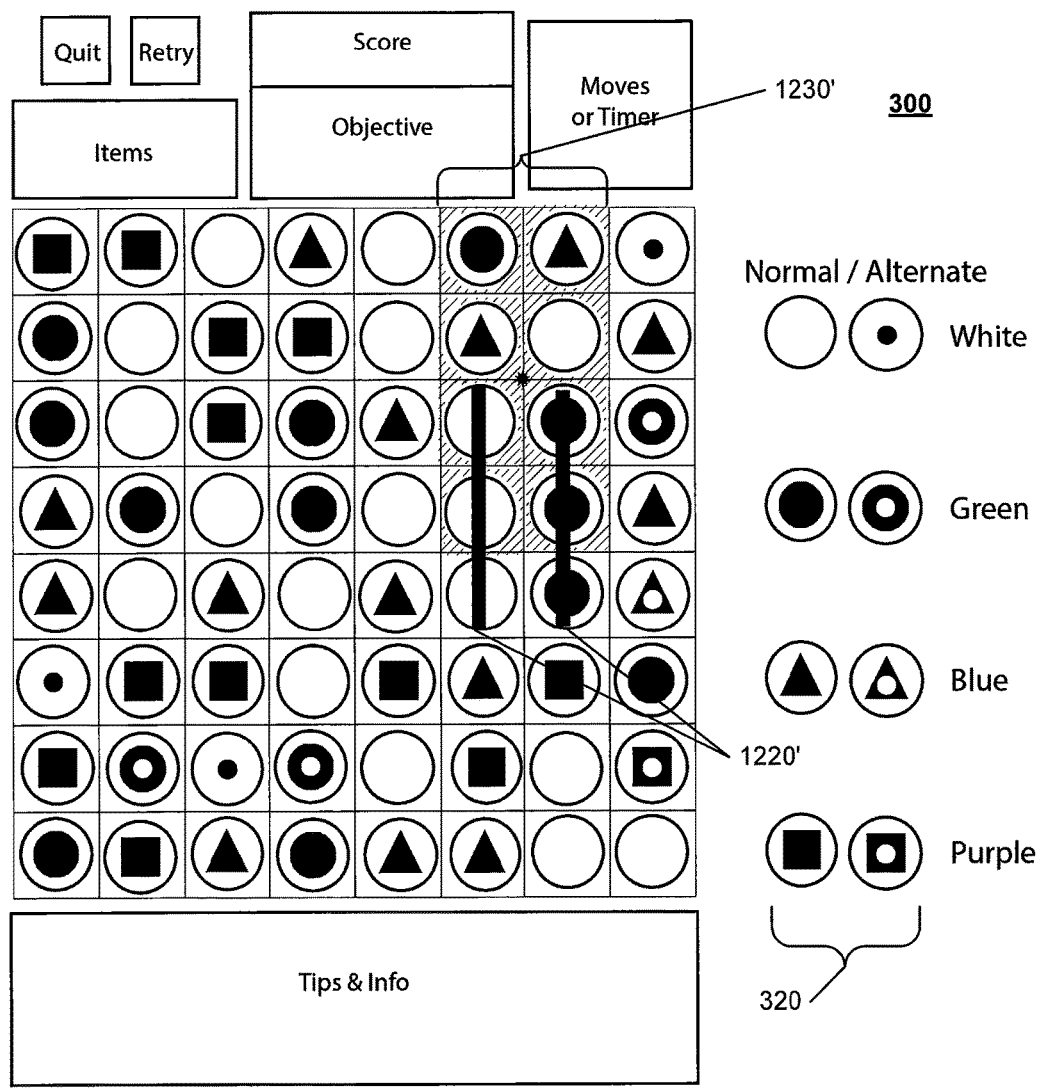

Referring to FIG. 12D, a transformed two-dimensional vertical grouping 1230' of game tiles 320 is displayed on the game field 300, including identified game matching conditions 1220'. The matching conditions 1220' may be handled in ways similar or identical to those described herein with respect to horizontal one- and/or two-dimensional groupings (e.g., FIGS. 7 and 8).

FIGS. 13A, 13B, 13C, and 13D illustrate the game field 300 of FIG. 3, further illustrating the selection and transformation of a diagonal grouping 1330 of game tiles 320, including diagonal groupings 1330' comprising multiple columns and rows, in accordance with some embodiments of the present inventive concepts.

Figure 13A:
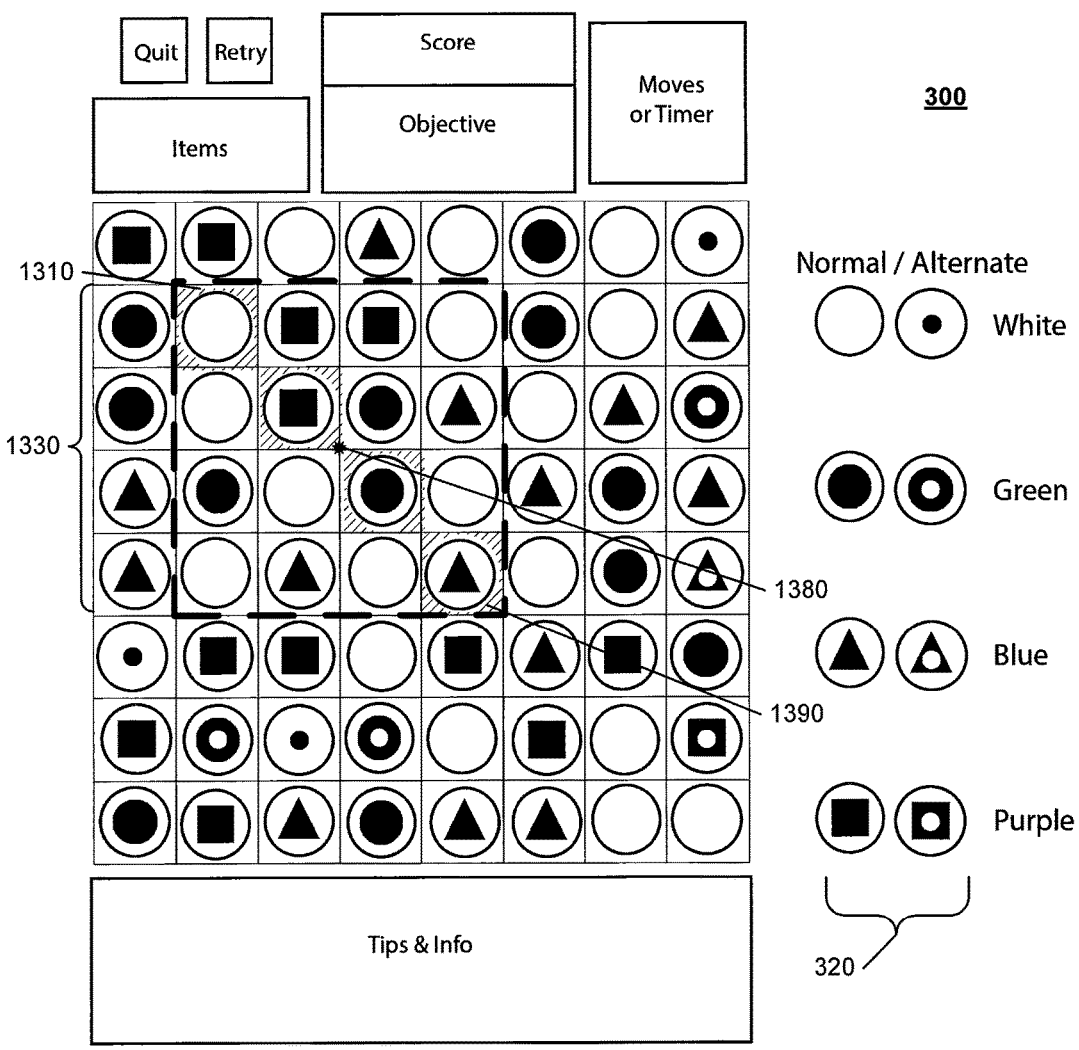
FIGS. 13A, 13B, 13C, and 13D illustrate the game field of FIG. 3, further illustrating the selection and transformation of a diagonal grouping of game tiles, including diagonal groupings comprising multiple columns and rows, in accordance with some embodiments of the present inventive concepts.

Referring to FIG. 13A, a diagonal grouping 1330 of game tiles 320 is indicated including game tiles 320 between a starting field position 1310 and an ending field position 1390. The starting field position 1310 and the ending field position 1390 may be selected in ways similar or identical to those described herein with respect to horizontal groupings 530.

In some embodiments, since the ending field position 1390 is on both a different row and a different column than the starting field position 1310, it may be necessary for the computer device 100 to differentiate between selection of a diagonal grouping 1330 and the selection of a two-dimensional grouping (e.g. 1130, FIG. 11). The computer device 100 may accomplish this by using a special selection mode for two-dimensional groupings and/or diagonal groupings. For example, in some embodiments, the computer device 100 may require three selection points for a two-dimensional grouping as described herein and two selection points (e.g. starting field position 1310 and ending field position 1390) for a one-dimensional diagonal grouping 1330 of game tiles 320 as described herein.

As illustrated in FIG. 13A, the defined diagonal grouping 1330 of game tiles 320 may have a point of rotation 1380 which can be determined by the computer device 100. The computer device 100 may transform the diagonal array of the grouping 1330 about the point of rotation 1380 in ways similar or identical to those described herein with respect to horizontal groupings 530 (e.g., FIG. 5).

For convenience of description, FIG. 13A includes a dashed outline of the rows and columns included as part of the defined diagonal grouping 1330. In some embodiments, since the diagonal grouping 1330 includes field positions 301 on multiple rows and columns, the transformation may include transforming both rows and columns of the grouping 1330 of game tiles 320 about a point of rotation 1380. In other words, the transformation of the diagonal grouping 1330 may be performed similarly to the two-dimensional transformation discussed herein. For example, for a given diagonal grouping 1330 including an array of $N_R$ rows and $N_C$ columns with the point of rotation 1380 at the midpoint of the array, the transformation of a given game tile 320 from a location (R,C) to a new location (R',C') may be given by $R'=(N_R-1)-R$ and $C'=(N_C-1)-C$. This equation assumes that the given row addresses go from 0 to $N_R-1$ and the given column addresses go from 0 to $N_C-1$. For example, a defined grouping 1330, such as the one illustrated in FIG. 13A, may include four rows and four columns. In such a diagonal array, the transformation from original position to new position may be as illustrated in the following Table 2:

TABLE 2

Example Transformation for a Diagonal Array

| Original Row | Original Column | New Row | New Column |
|---|---|---|---|
| 0 | 0 | 3 | 3 |
| 1 | 1 | 2 | 2 |

TABLE 2-continued

Example Transformation for a Diagonal Array

| Original Row | Original Column | New Row | New Column |
|---|---|---|---|
| 2 | 2 | 1 | 1 |
| 3 | 3 | 0 | 0 |

Figure 13B:
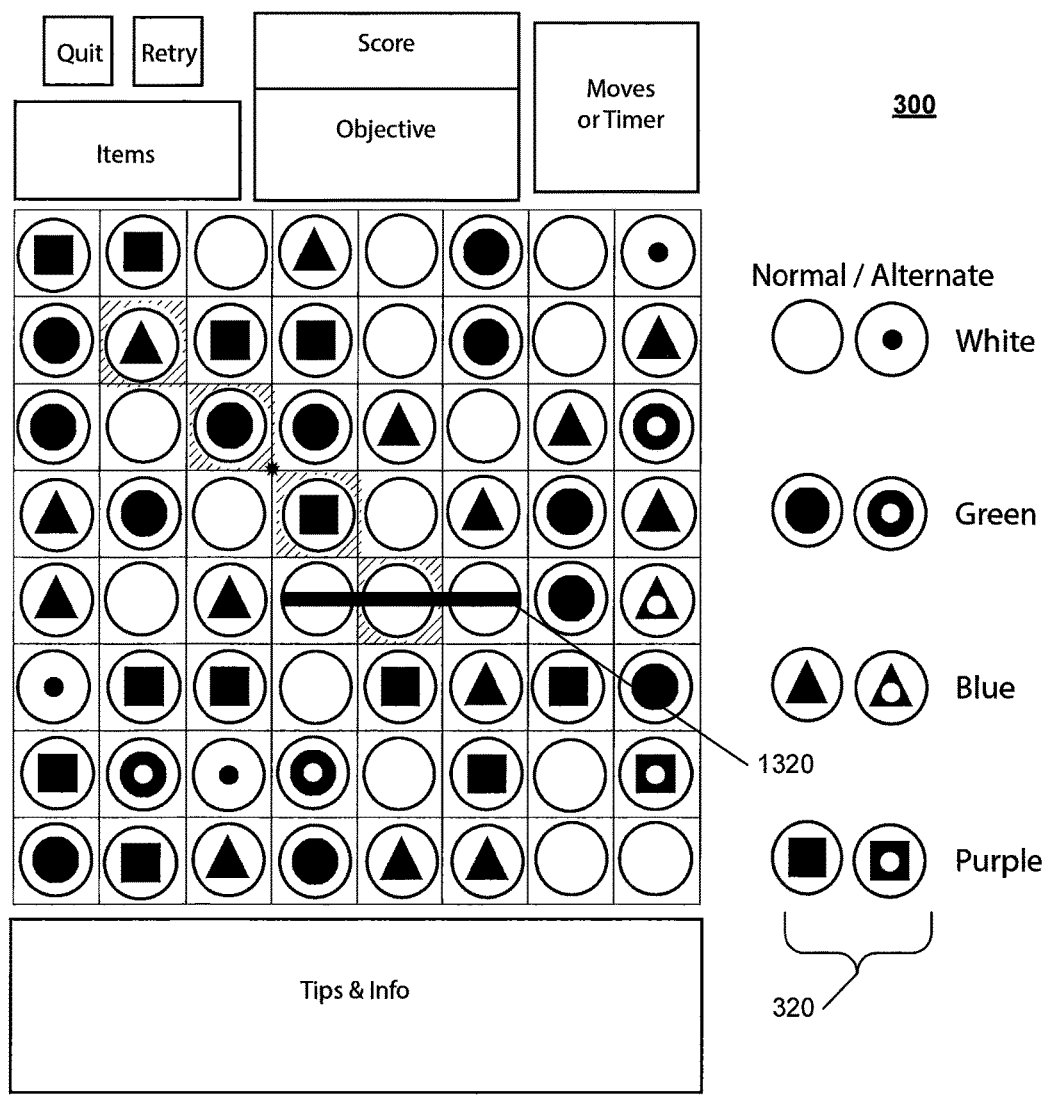

Referring to FIG. 13B, a transformed diagonal grouping 1330 of game tiles 320 is displayed on the game field 300, including an identified game matching condition 1320. The matching condition 1320 may be handled in ways similar or identical to those described herein with respect to horizontal groupings 530 (e.g., FIG. 6).

Figure 13C:
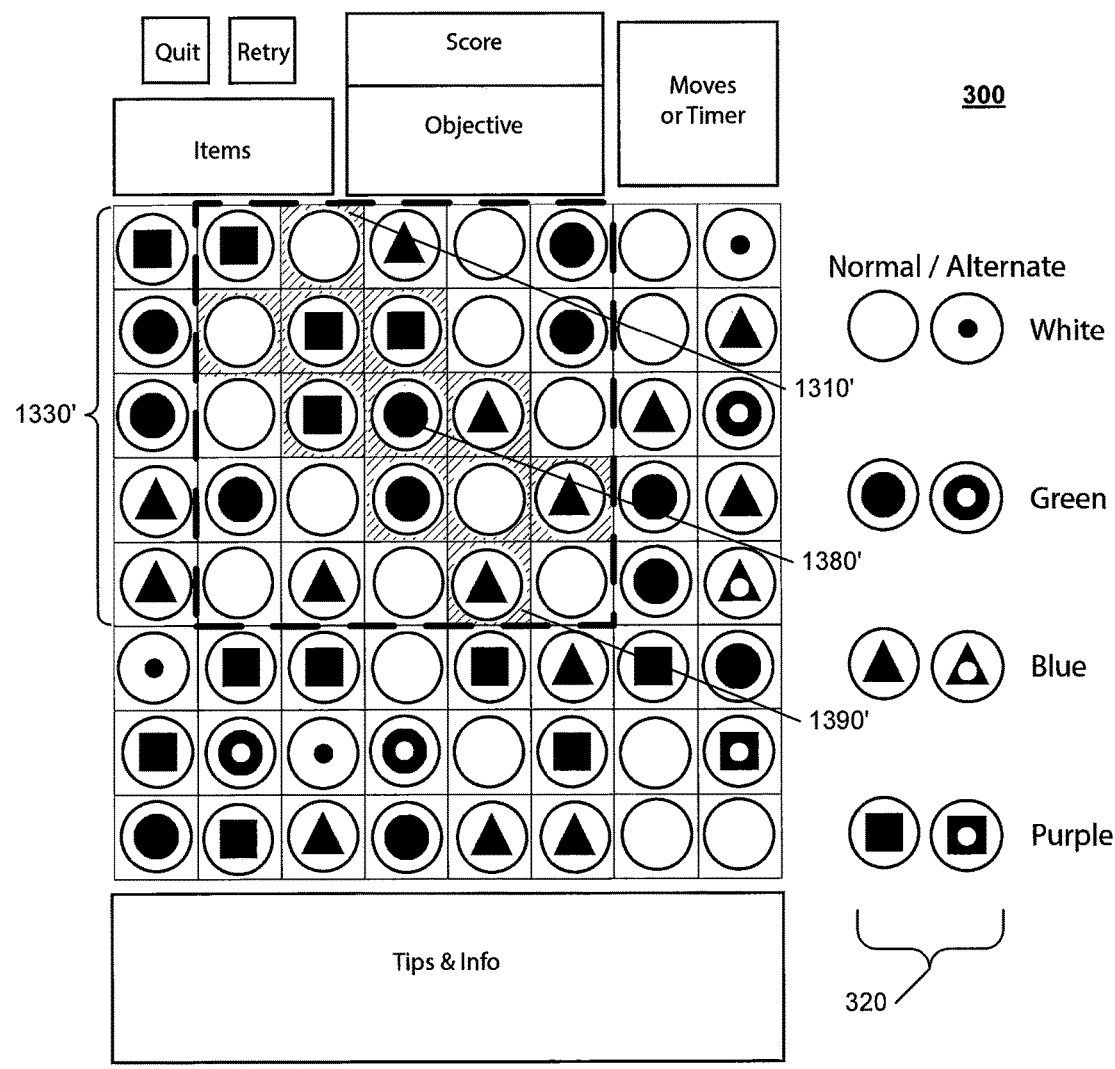

Referring to FIG. 13C, a two-dimensional diagonal grouping 1330' of game tiles 320 is indicated including game tiles 320 between a starting field position 1310' and an ending field position 1390' and including a point of rotation 1380'. The starting field position 1310' and the ending field position 1390' may be selected in ways similar or identical to those described herein with respect to horizontal two-dimensional groupings 1130 (e.g., FIG. 11A).

As illustrated in FIG. 13C, the defined two-dimensional diagonal grouping 1330' may have a point of rotation 1380' which can be determined by the computer device 100. The computer device 100 may transform the two-dimensional diagonal array of the grouping 1330' of game tiles 320 in ways similar or identical to those described herein with respect to horizontal two-dimensional groupings 1130 (e.g., FIG. 11B).

For convenience of description, FIG. 13C includes a dashed outline of the rows and columns included as part of the defined grouping 1330'. In some embodiments, since the diagonal grouping 1330' includes field positions 301 on multiple rows and columns, the transformation may include transforming both rows and columns of the two dimensional diagonal grouping 1330' of game tiles 320 about the point of rotation 1380'. In other words, the transformation of the two-dimensional diagonal grouping 1330' may be performed similarly to the two-dimensional transformation discussed herein. For example, for a given diagonal grouping 1330' including an array of $N_R$ rows and $N_C$ columns with the point of rotation 1380' at the midpoint, the transformation of a given game tile 320 from a location (R,C) to a new location (R',C') may be given by $R'=(N_R-1)-R$ and $C'=(N_C-1)-C$. This equation assumes that the given row addresses go from 0 to $N_R-1$ and the given column addresses go from 0 to $N_C-1$. For example, a defined grouping 1330', such as the one illustrated in FIG. 13C, may include five rows and five columns. In such a two-dimensional diagonal array, the transformation from original position to new position may be as illustrated in the following Table 3:

TABLE 3

Example Transformation for a Two Dimensional Diagonal Array

| Original Row | Original Column | New Row | New Column |
|---|---|---|---|
| 0 | 1 | 4 | 3 |
| 1 | 0 | 3 | 4 |
| 1 | 1 | 3 | 3 |
| 1 | 2 | 3 | 2 |
| 2 | 1 | 2 | 3 |
| 2 | 2 | 2 | 2 |
| 2 | 3 | 2 | 1 |
| 3 | 2 | 1 | 2 |
| 3 | 3 | 1 | 1 |

TABLE 3-continued

Example Transformation for a Two Dimensional Diagonal Array

| Original Row | Original Column | New Row | New Column |
|---|---|---|---|
| 3 | 4 | 1 | 0 |
| 4 | 3 | 0 | 1 |

Figure 13D:
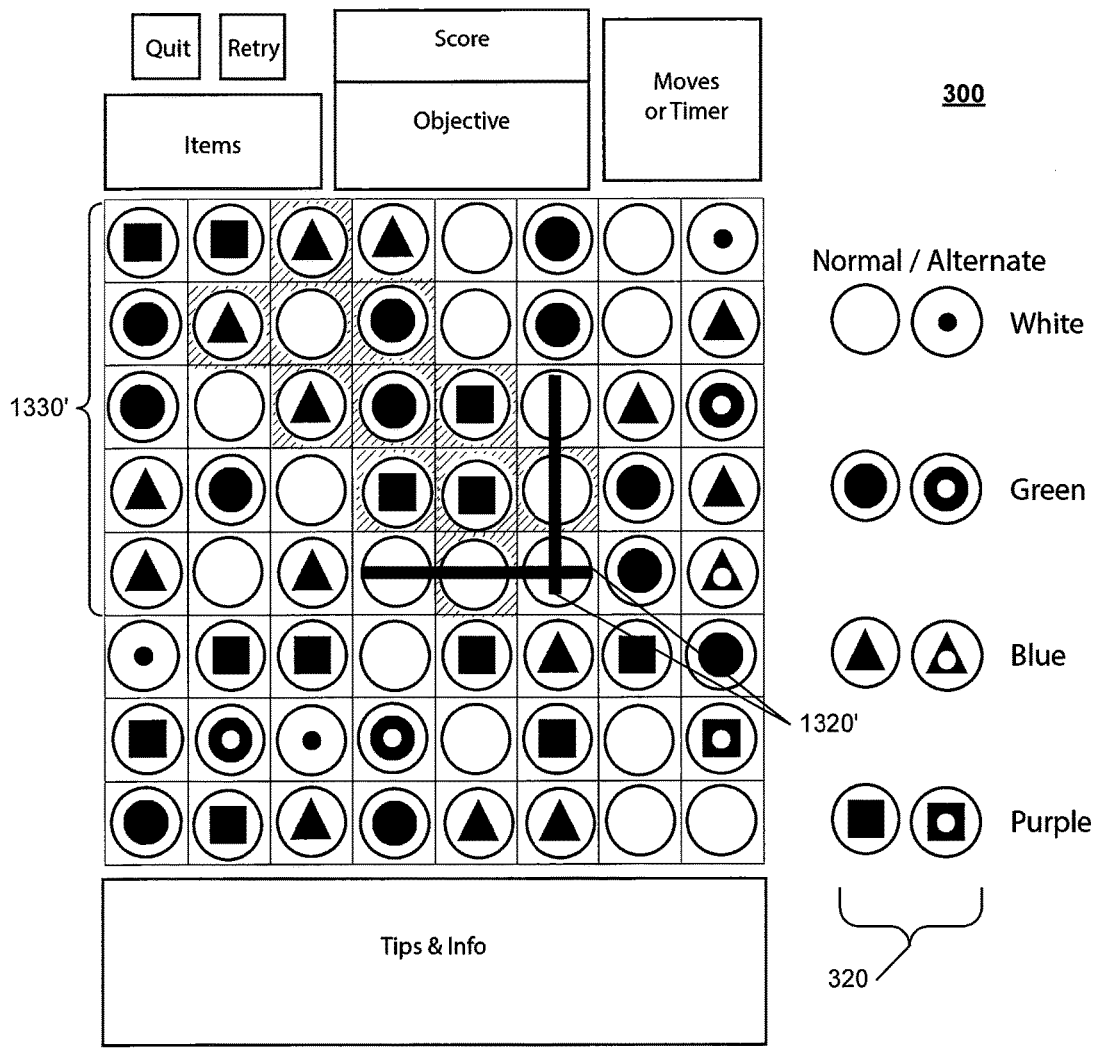

Referring to FIG. 13D, a transformed two-dimensional vertical grouping 1330' is displayed on the game field 300, including identified game matching conditions 1320'. The matching conditions 1320' may be handled in ways similar or identical to those described herein with respect to one- and/or two-dimensional groupings (e.g., FIGS. 7 and 8)

FIGS. 14A through 14D illustrate various game mechanisms which can be used by the computer device 100 to graphically illustrate the transformation of the defined grouping 530 of game tiles 320 on the game field 300. In some embodiments, these described techniques may be combined in a single embodiment such that multiple effects, either in combination or consecutively, are utilized to indicate a transformation.

Figure 14A:
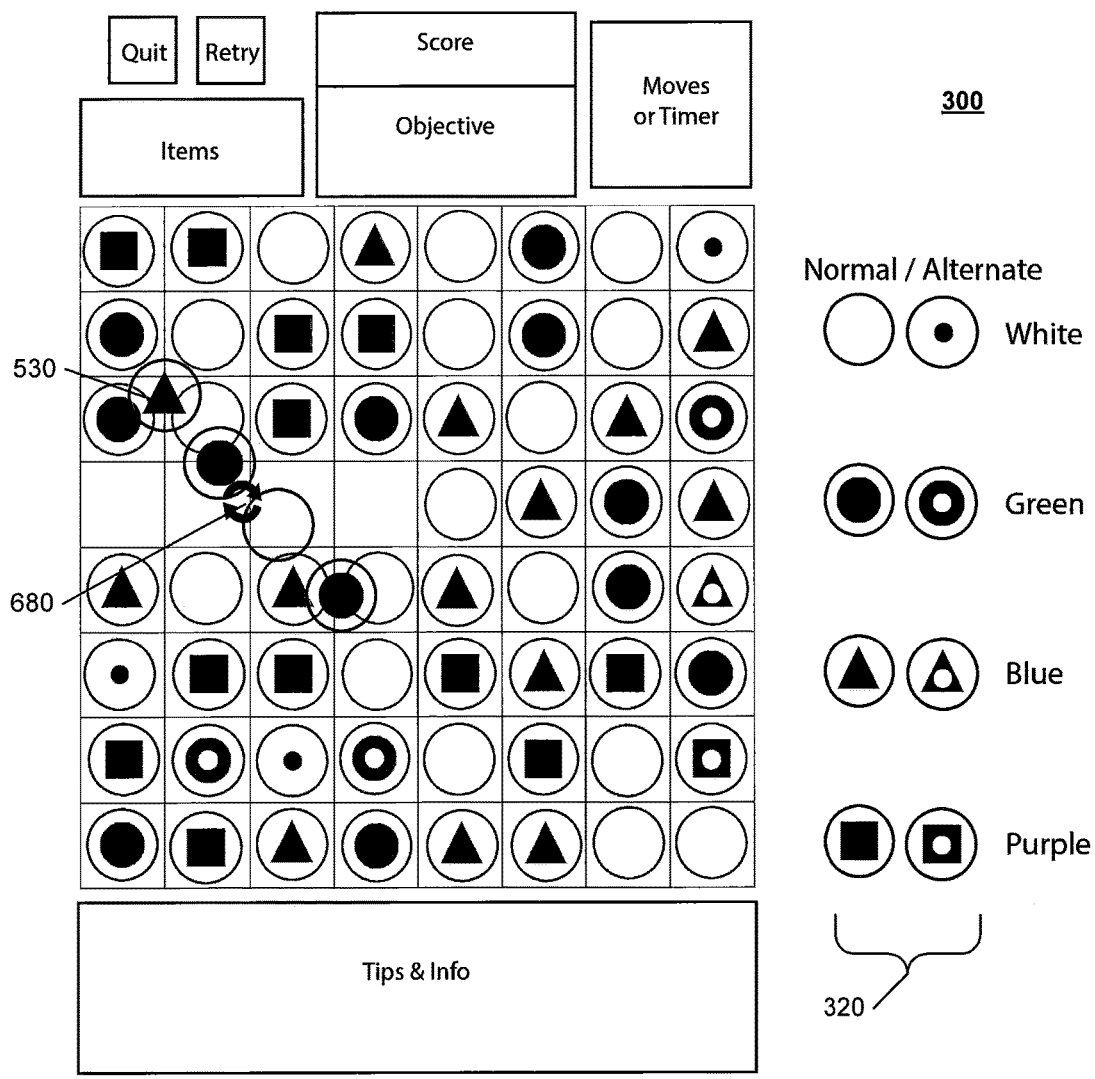
FIG. 14A illustrates the game field of FIG. 5, further illustrating display methods of transforming a selected grouping of game tiles utilizing graphical rotation in accordance with some embodiments of the present inventive concepts.

FIG. 14A illustrates the game field 300 of FIG. 5, further illustrating display methods of transforming a selected grouping 530 of game tiles 320 utilizing graphical rotation in accordance with some embodiments of the present inventive concepts.

Referring to FIG. 14A, the computer device 100 may graphically indicate the transformation by physical rotation of the defined grouping 530 of game tiles 320 about the point of rotation 680. The graphical rotation may be clockwise or counterclockwise.

In FIG. 14A, the non-selected game tiles 320 which are not members of the grouping 530 are illustrated as grayed-out game tiles 320. This graying out is for purposes of illustration only, to highlight the rotation of the defined grouping 530 of game tiles 320, and is not a necessary feature of the present inventive concepts. Some embodiments provide that other manipulations of the defined grouping 530 of game tiles 320 are possible without deviating from the scope and spirit of the present inventive concepts. For example, the defined grouping 530 of game tiles 320 may be manipulated so as to be either larger or smaller than other non-selected games tiles 320 of the game field 300. Other effects are possible to highlight the defined grouping 530 of game tiles 320 during its rotation operation.

In some embodiments, the graphical rotation method may graphically give the perception of a circular rotation of the defined grouping 530 of game tiles 320 about an axis which is perpendicular to the game field 300.

Figure 14B:
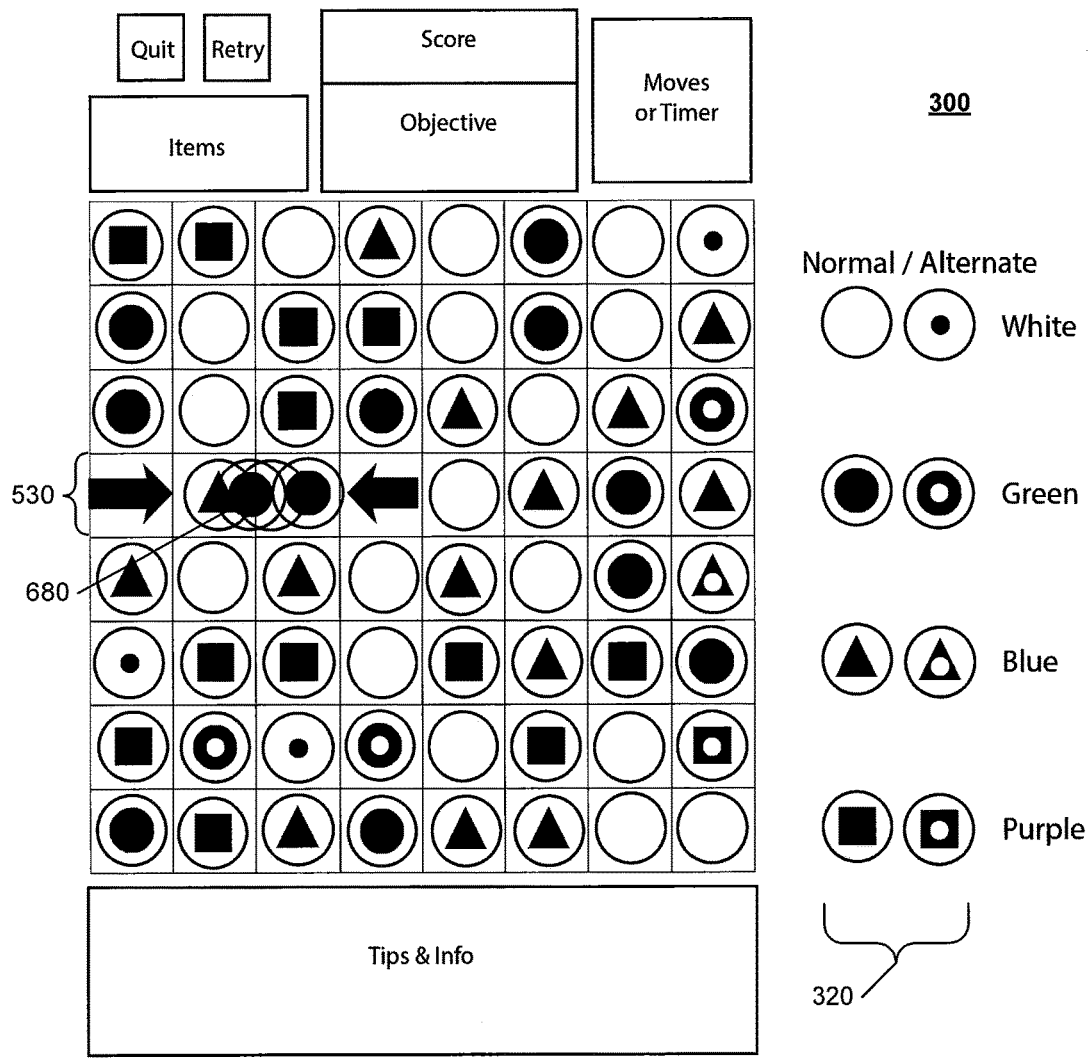
FIG. 14B illustrates the game field of FIG. 5, further illustrating display methods of transforming a selected grouping of game tiles utilizing a graphical shifting in accordance with some embodiments of the present inventive concepts.

FIG. 14B illustrates the game field 300 of FIG. 5, further illustrating display methods of transforming a selected grouping 530 of game tiles 320 utilizing a graphical shifting in accordance with some embodiments of the present inventive concepts.

Referring to FIG. 14B, the computer device 100 may graphically indicate the transformation by shifting individual game tiles 320 of the defined grouping 530 from their original positions towards the point of rotation 680 and then shifting to their new positions from the point of rotation 680. The graphical shifting method may give the impression of a contracting visual effect such that the game tiles 320 contract from their original positions into the point of rotation 680 and then expand out into their new positions.

In some embodiments, the graphical shifting method may graphically give the perception of a circular rotation of the defined grouping 530 of game tiles 320 about an axis which is parallel to the game field 300.

Figure 14C:
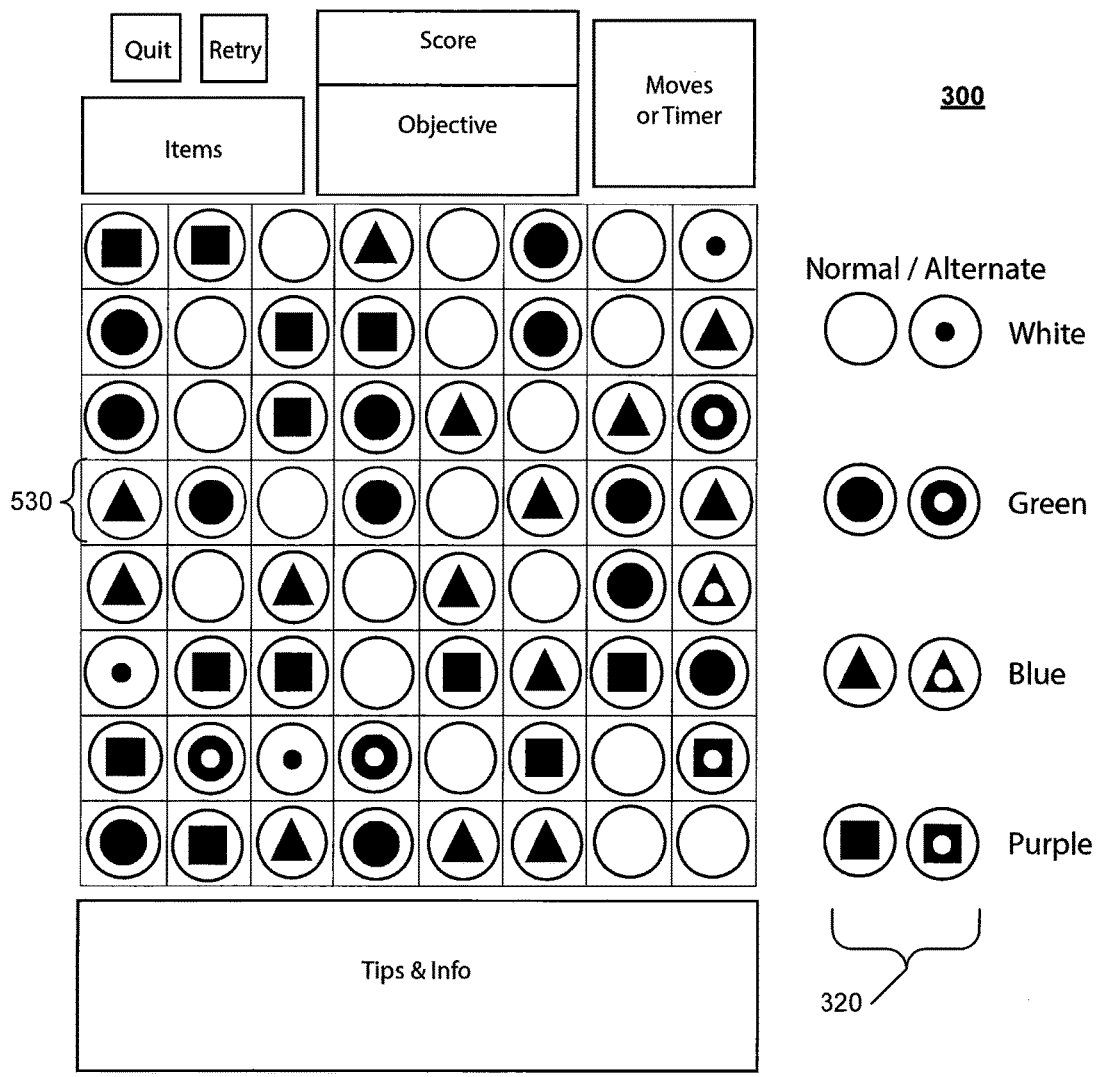
FIG. 14C illustrates the game field of FIG. 5, further illustrating display methods of transforming a selected grouping of game tiles utilizing graphical fading in accordance with some embodiments of the present inventive concepts.

FIG. 14C illustrates the game field 300 of FIG. 5, further illustrating display methods of transforming a selected grouping 530 of game tiles 320 utilizing graphical fading in accordance with some embodiments of the present inventive concepts.

Referring to FIG. 14C, the computer device 100 may visually indicate the transformation by graphically fading out individual game tiles 320 of the defined grouping 530 at their original positions and then graphically fading in individual game tiles 320 at their new positions using a visual effect. The graphical fading visual effect may give the impression of the game tiles 320 disappearing from their original and reappearing at their new positions.

Figure 14D:
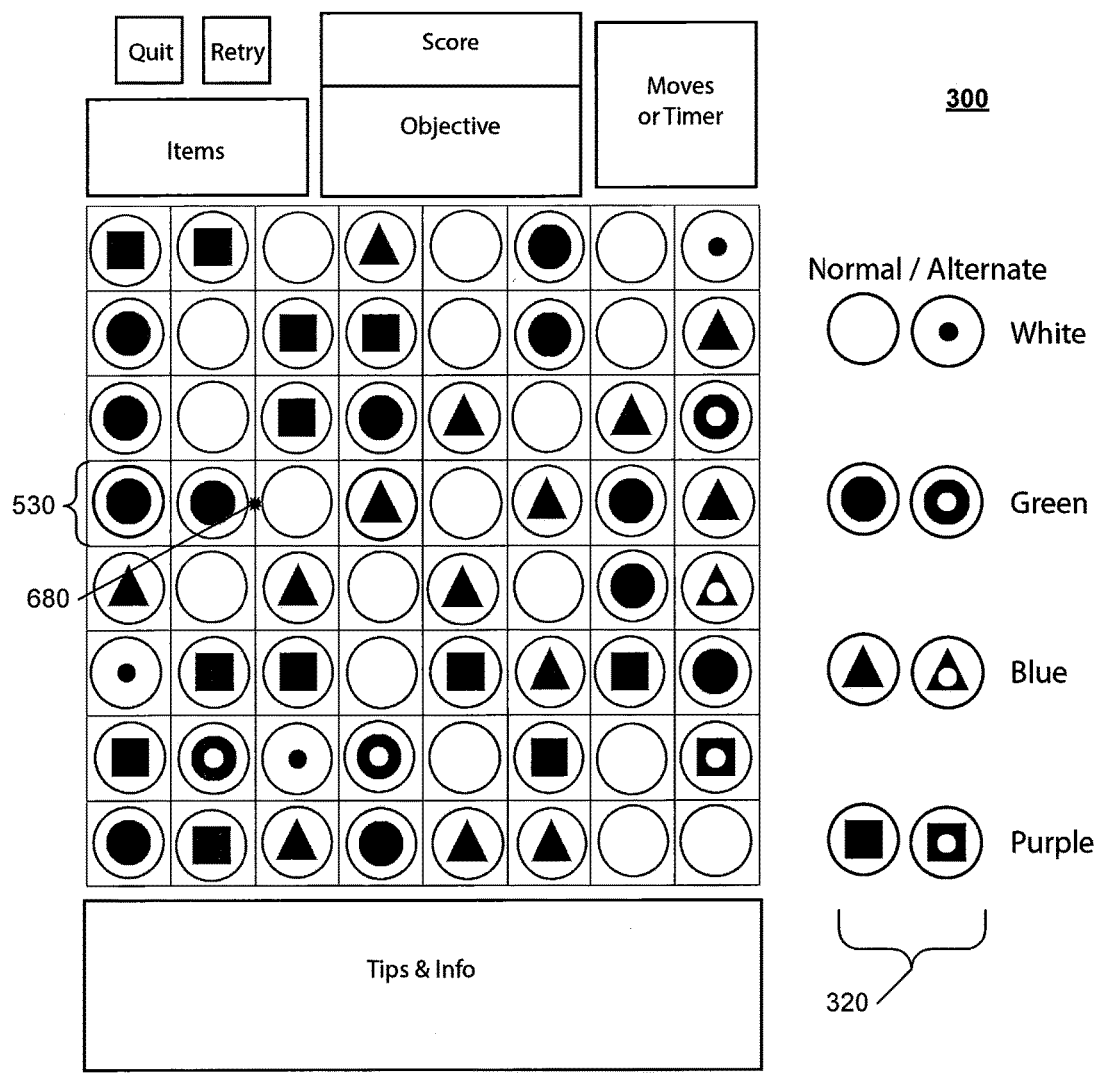
FIG. 14D illustrates the game field of FIG. 5, further illustrating display methods of transforming a selected grouping of game tiles utilizing swapping of tiles in accordance with some embodiments of the present inventive concepts.

FIG. 14D illustrates the game field 300 of FIG. 5, further illustrating display methods of transforming a selected grouping 530 of game tiles 320 utilizing swapping of game tiles 320 in accordance with some embodiments of the present inventive concepts.

Referring to FIG. 14D, the computer device 100 may graphically indicate the transformation by serially swapping individual game tiles 320 of the defined grouping 530 with their counterpart game tile 320 symmetric to the point of rotation 680. As the transformation of the game tiles 320 about the point of rotation 680 results in a symmetrical swapping of game tiles 320, the transformation may be accomplished by selectively swapping individual corresponding pairs of game tiles 320 of the defined grouping 530.

In FIG. 14D, game tiles 320 which are not being acted upon in a given selective swap are illustrated as grayed-out game tiles 320. For example, in a given swap operation of the transformation of the grouping 530 of game tiles 320, the computer device 100 may swap two individual game tiles 320, illustrated as the non-grayed tiles in the BLUE and GREEN category. The computer device 100 may continue swapping individual game tiles 320 until the transformation of the grouping 530 of game tiles 320 is complete. The graying out of FIG. 14D is for purposes of illustration only, to highlight the swapping of the selected game tiles 320, and is not a necessary feature of the present inventive concepts. Some embodiments provide that other manipulations of the defined grouping 530 of game tiles 320 are possible without deviating from the scope and spirit of the present inventive concepts.

Figure 15A:
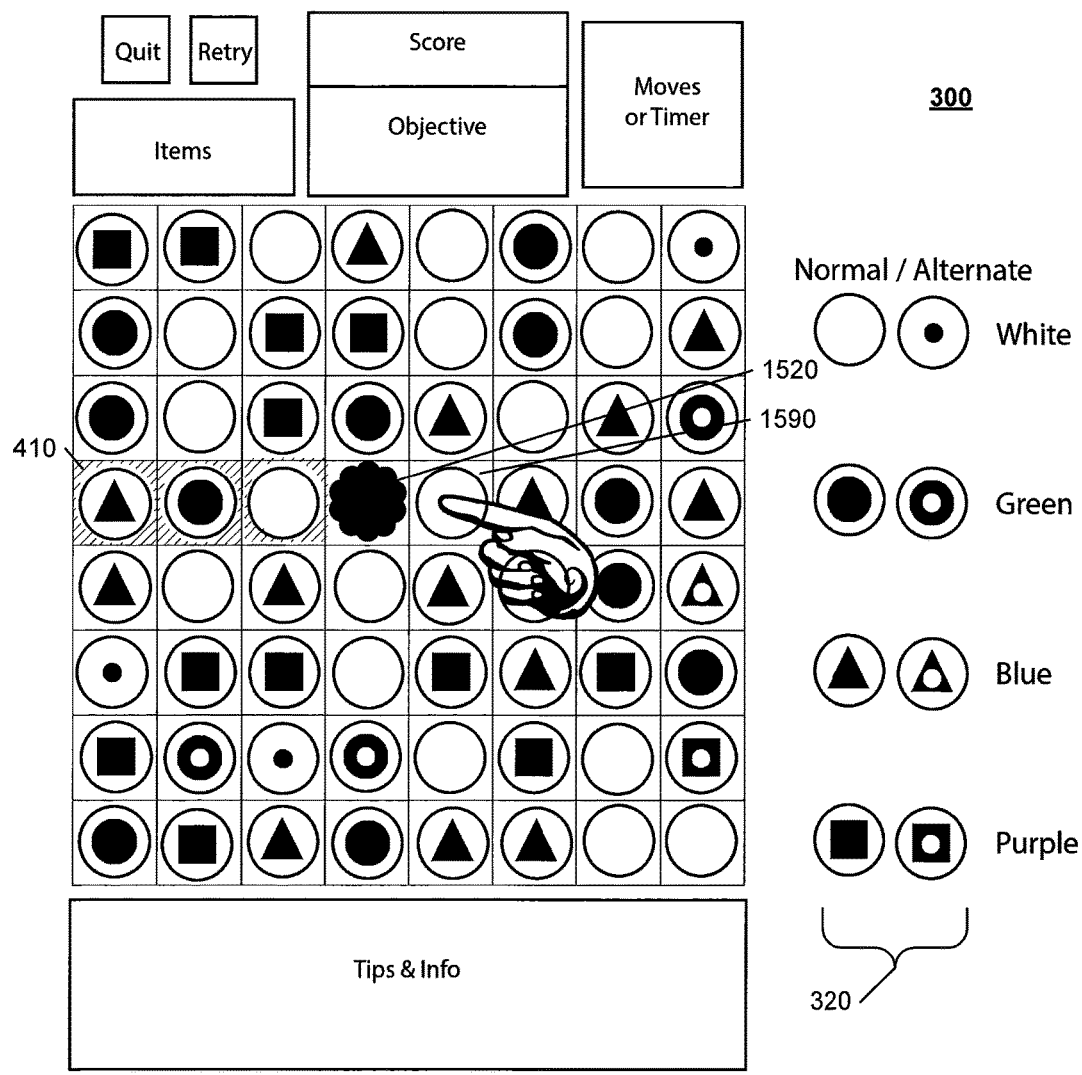
FIG. 15A is an example output game field displayed by an output circuit of an example computer device as illustrated in FIG. 1 including a blocking game tile in accordance with some embodiments of the present inventive concepts.

FIG. 15A is an example output game field 300 displayed by an output circuit 114 of an example computer device 100 as illustrated in FIG. 1 including a blocking game tile 1520 in accordance with some embodiments of the present inventive concepts.

Referring to FIG. 15A, a configuration of game tiles 320 may be similar to those configurations illustrated previously with the addition of a blocking game tile 1520. The blocking game tile 1520 may modify the game mechanic as described herein so as to block the formation of a game tile grouping (such as the defined grouping 530 of FIG. 5). As illustrated in FIG. 15A, the user may provide input indicating a starting field position 410. However, if the user attempts to provide an ending field position 1590 which would create a defined grouping of game tiles 320 which would include the blocking game tile 1520, the computer device 100 may reject the ending field position 1590. In some embodiments, an attempt to include a blocking game tile 1520 within a defined grouping may cause the computer device 100 to reject any currently defined grouping and deselect any currently selected game tiles 320.

The rejection of the ending field position 1590 may be provided in multiple ways. For example, the computer device 100 may utilize the output circuit 114 to play a sound via a speaker of the computer device 100. In some embodiments, the computer device 100 may flash the display device 124 or otherwise provide an indication within the game field 300 that the ending field position 1590 will not be allowed.

In some embodiments, as described herein, the computer device 100 may place the game field 300 into a selection mode responsive to the user providing the starting field position 410 which continuously and automatically updates potential defined groups of game tiles 320 in response to movement of an input device (e.g. pointing device 127 of FIG. 1) by the user. When such a selection mode is utilized, the computer device 100 may indicate that the blocking game tile 1520 may not be a part of a defined grouping by only highlighting potential groups of game tiles 320 which do not include the blocking game tile 1520.

Figure 15B:
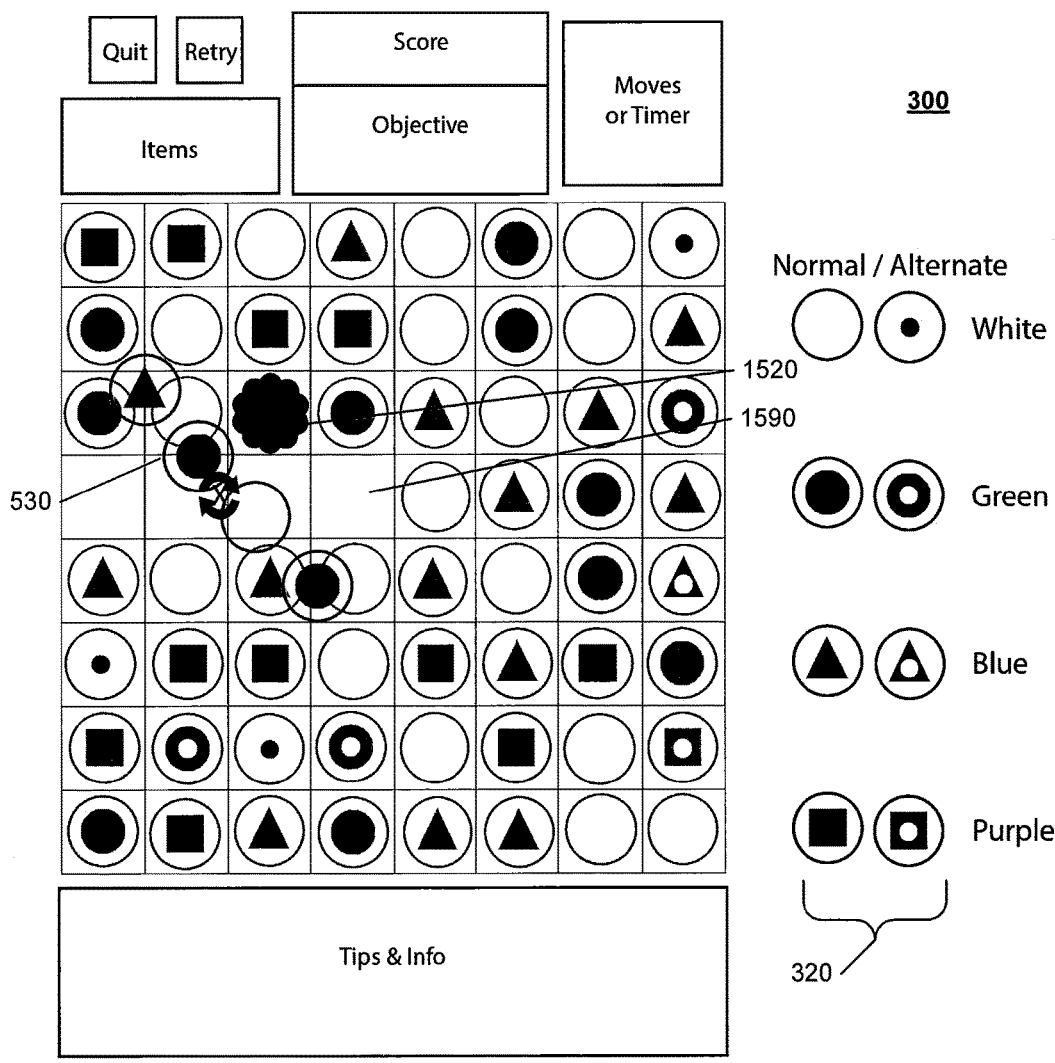
FIG. 15B is an example output game field displayed by an output circuit of an example computer device as illustrated in FIG. 1 including another embodiment of a blocking game tile in accordance with some embodiments of the present inventive concepts.

FIG. 15B is an example output game field 300 displayed by an output circuit 114 of an example computer device 100 as illustrated in FIG. 1 including another embodiment of a blocking game tile 1520 in accordance with some embodiments of the present inventive concepts.

Referring to FIG. 15B, a configuration of game tiles 320 may be similar to those configurations illustrated previously in FIG. 14A with the addition of a blocking game tile 1520. As discussed with respect to FIG. 14A, the computer device 100 may effect a transformation of a defined grouping 530 of game tiles 320 via a visual rotation of the grouping 530 into its new position. However, if a blocking game tile 1520 is within the path of the visual rotation of the define grouping 530 of game tiles 320, the computer device 100 may indicate to the user that the grouping 530 of game tiles 320 may not be rotated into their new positions. In other words, even though the defined grouping 530 does not contain a blocking game tile 1520, the computer device 100 may still fail to perform the transformation of the defined grouping 530 if there is a blocking game tile 1520 within the path of the graphical rotation of the grouping 530.

The computer device 100 may indicate the obstruction of the blocking game tile 1520 in a number of ways. For example, the computer device 100 may begin the rotation of the defined grouping 530 of game tiles 320, but cease the rotation when the graphical rotation of the grouping 530 visually contacts the blocking game tile 1520. In some embodiments, the defined grouping 530 of game tiles 320 may rotate to contact the blocking game tile 1520 and then revert back to their original positions. In some embodiments, the computer device 100 may determine that a blocking game tile 1520 would be in the path of a potential defined grouping 530 and may refuse to accept an ending field position 1590 that would create such a defined grouping 530 of game tiles 320.

Though illustrated as a blocking game tile 1520, it will be understood that the computer device 100 may indicate an obstruction via a blocking field position instead of, or in addition to, a blocking game tile 1520. For example, a field position 301 may be modified on the game field 300 to indicate that the field position 301 will block the formation of a defined grouping 530. Other operations with respect to a blocking field position may be similar to those described in FIGS. 15A and 15B with respect to the blocking game tile 1520. That is to say that, in some embodiments, a blocking field position may operate similarly to a field position 301 containing a blocking game tile 1520.

Figure 16:
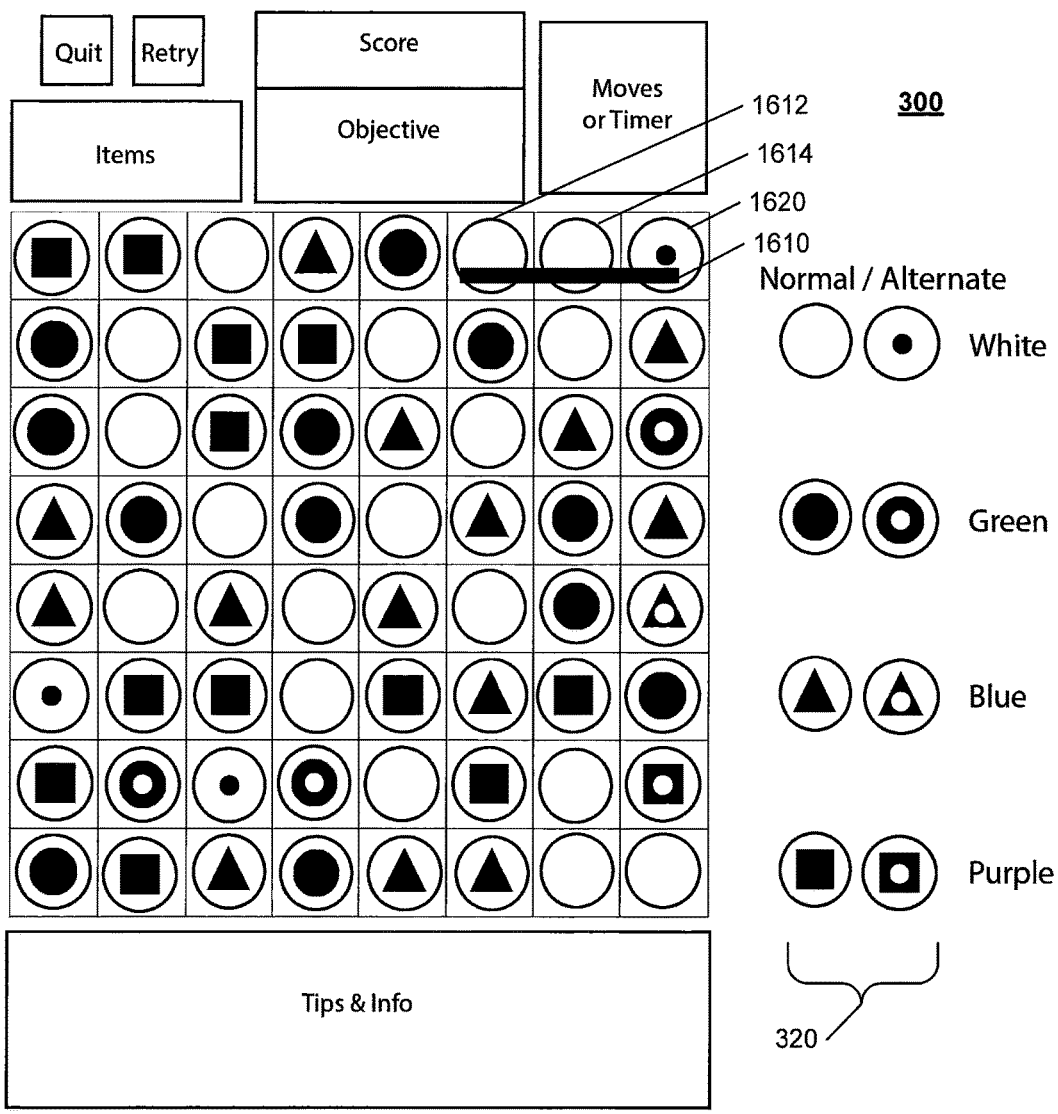
FIG. 16 is an example output game field displayed by an output circuit of an example computer device as illustrated in FIG. 1 illustrating the use of alternate categories for game tile matching in accordance with some embodiments of the present inventive concepts.

FIG. 16 is an example output game field 300 displayed by an output circuit 114 of an example computer device 100 as illustrated in FIG. 1 illustrating the use of alternate categories for game tile matching in accordance with some embodiments of the present inventive concepts.

Referring to FIG. 16, a match 1610 is illustrated which highlights the use of alternate categories for the purposes of a matching game condition. As illustrated in FIG. 16, a game tile 1620 which represents an alternate representation for a given category may still be considered a match for purposes of determining the existence of a matching game condition. For example, FIG. 16 illustrates two adjacent game tiles 1612 and 1614 of the WHITE category. Adjacent the two game tiles 1612 and 1614 is a game tile 1620 which is illustrated as an alternate representation of the WHITE category. For this configuration, the computer device 100 may determine that a match condition exists with respect to the three game tiles, 1612, 1614, and 1620 even though the game tile 1620 is visually different than the other two game tiles 1612 and 1614. In some embodiments, as mentioned herein, a respective game tile 320 may be a member of multiple categories simultaneously for purposes of determining whether a match condition exists.

FIGS. 17-20 are flowcharts illustrating example methods for programming a CPU 101 of a computer device 100 to process user input and perform operations in accordance with some embodiments of the present inventive concepts.

Figure 17:
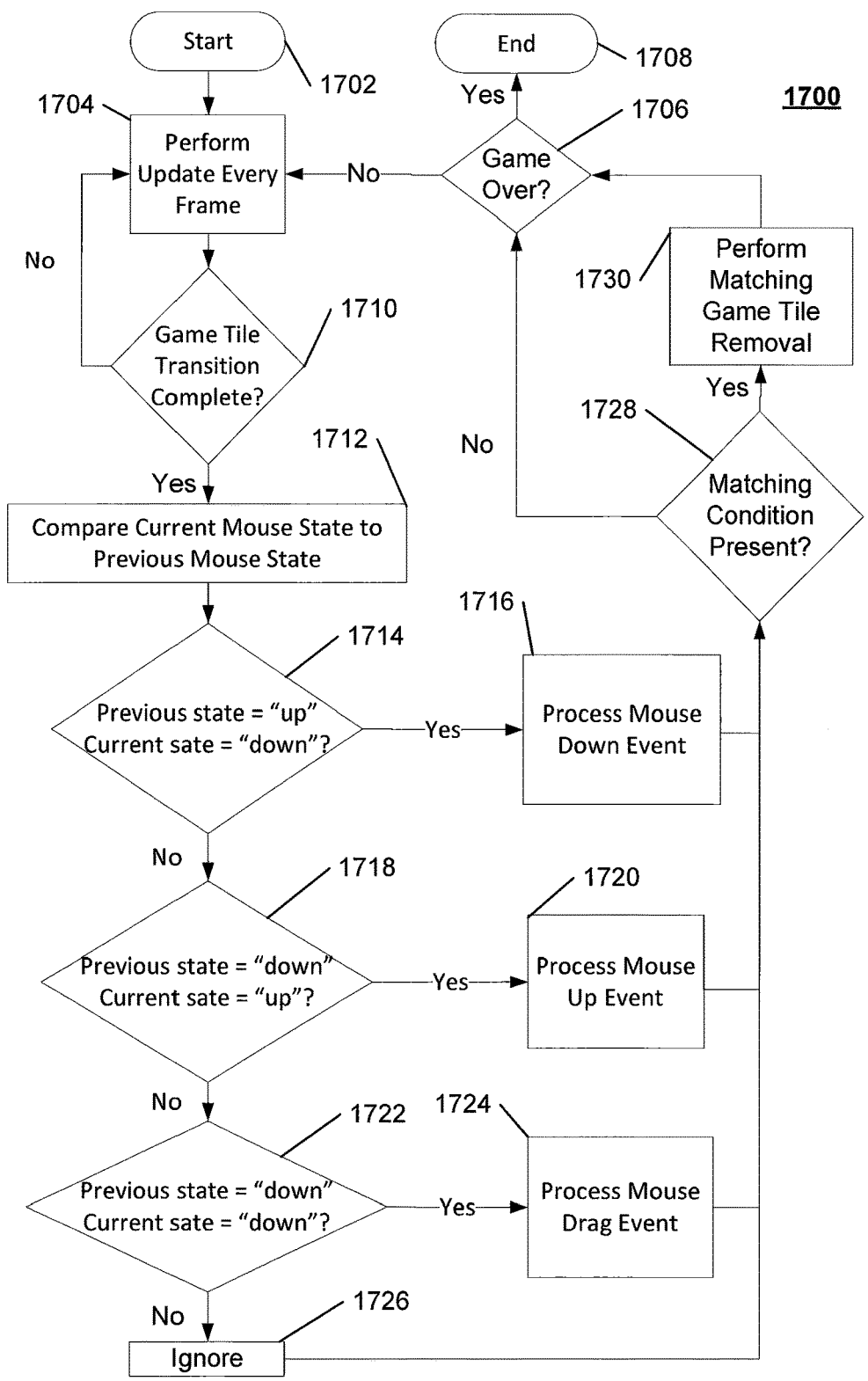
FIGS. 17-20 are flowcharts illustrating example methods for programming a processor of a computer device to process user input and perform operations in accordance with some embodiments of the present inventive concepts.

Referring to FIG. 17, high-level process 1700 is illustrated for programming a CPU 101 of a computer device 100 (e.g. FIG. 1) to analyze user input provided via an input circuit 113. As described herein, the user input may be provided by and/or received from a mouse. However, the user input may be provided by and/or received from any one of a number of input devices and/or device types. For example, in some embodiments input devices for game play may include a keyboard 126, a pointing device (e.g. mouse) 127, a touch screen of a display device 124, voice input, visual input (e.g. eye tracking), a tablet, a pen, etc. Other types of input are possible without deviating from the scope and spirit of the present inventive concepts.

In some embodiments, the process 1700 may include the CPU 101 processing potential input every frame. A frame may be a unit of graphical display processing that may be provided to an output device such as a display device 124 to provide a graphical output to the user of the game. The frames may refresh at a high rate so as to provide a moving graphical display. In some embodiments, the CPU 101 may provide frame updates so as to provide over 250 frames per second. In some embodiments, the frame rate may be less than 250 frames per second, such as 60 frames per second or lower. The frame rate may change during the game in response to various game conditions or conditions experienced by the CPU 101. Once the CPU 101 starts the game 1702, the CPU 101 may perform an update based on user input every frame 1704. These updates may continue until a condition is reached when the game is over 1706, at which time the processing may end 1708.

In some embodiments, the frame update may begin by checking whether any transitions of game tiles 320 being graphically performed on the display are complete 1710. The CPU 101 may wait until these transitions are complete before further processing.

Once the current transitions of game tiles 320 are complete, the processor 101 may compare 1712 a current state of an input device, such as a mouse or pointing device 127, with a prior state of the input device. For convenience of description, FIG. 17 illustrates the use of a mouse, but it will be understood, as described herein, that other input devices are possible. With a mouse as an input device, the CPU 101 may examine the current state of a mouse button, which may be "up" (not pressed) or "down" (pressed). As part of this comparison 1712, four primary determinations are possible.

A first determination 1714 may detect when a current state of the mouse is "down," but the previous state was "up." When this determination 1714 is made, the CPU 101 may process a "mouse down" event 1716, described herein.

A second determination 1718 may detect when a current state of the mouse is "up," but the previous state was "down." When this determination 1718 is made, the CPU 101 may process a "mouse up" event 1720, described herein.

A third determination 1722 may detect when a current state of the mouse is "down," and the previous state was "down." When this determination 1722 is made, the CPU 101 may process a "mouse drag" event 1724, described herein.

If the first three determinations are not made, then, as a result of elimination, the current state of the mouse may be "up" and the previous state was also "up." In such a case, it may indicate that the mouse state has not changed. When this determination is made, the CPU 101 may ignore 1726 the current state and continue processing.

After either ignoring 1726 or processing the event 1716, 1720, 1724, the CPU 101 may check to see if the position of game tiles 320 on the game field 300 has changed so as to indicate a matching condition 1728. If a matching condition is present, the CPU 101 may perform a graphical removal 1730 of the matching game tiles 320 on the game field 300 as described herein. If no match is present, the CPU 101 may check if the game is over 1706. If the game is not over, the CPU 101 may conclude the operation of the current frame and continue with processing of a new frame 1704.

Figure 18:
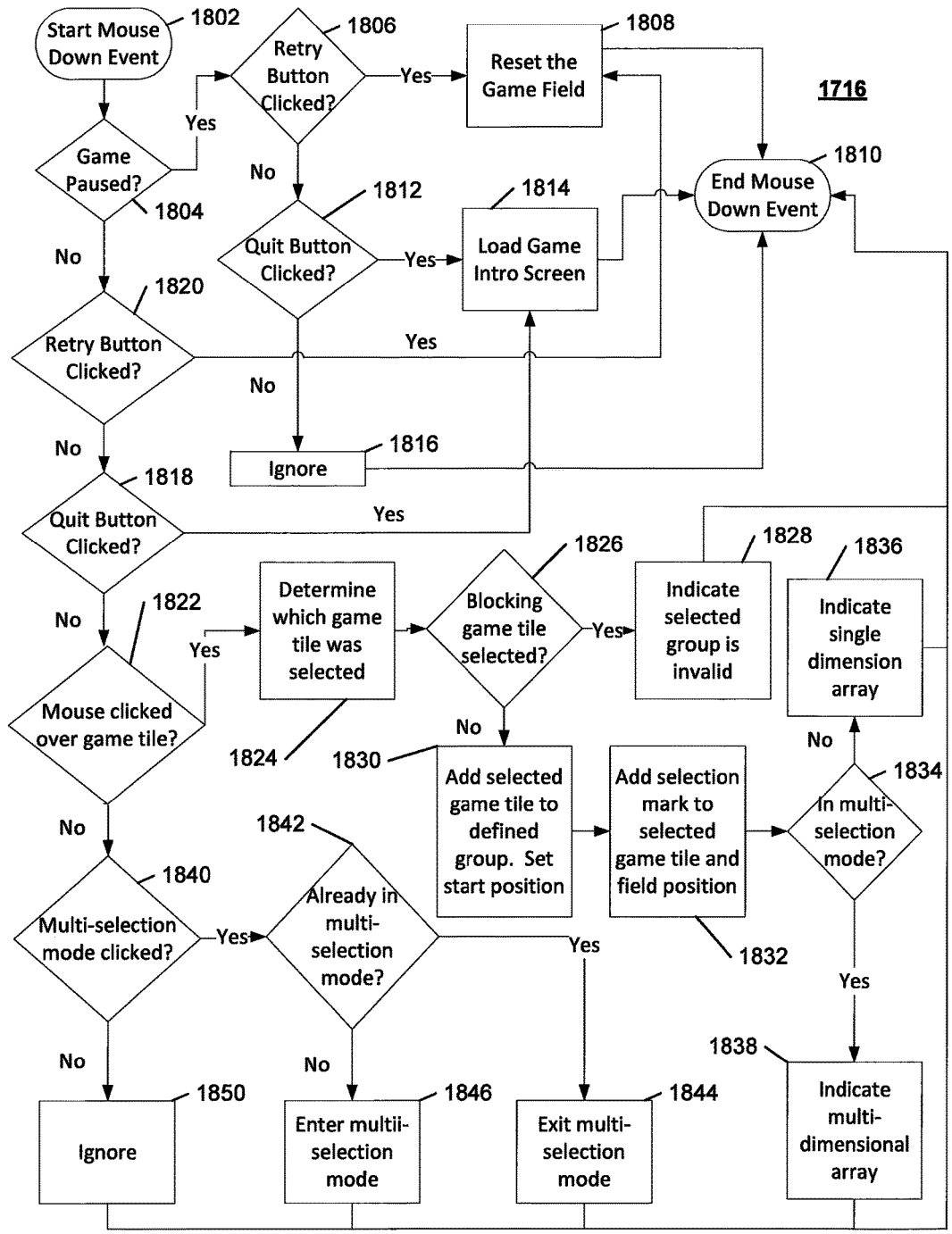

Referring to FIG. 18, a method for programming a CPU 101 of a computer device 100 to process a mouse down event 1716 is illustrated. The method may start 1802 with a determination whether the game is currently paused 1804. If the game is paused, the CPU 101 may determine if the retry button 304 has been selected. For example, the CPU 101 may make this determination based on the current location of a mouse pointer on the display screen 124. If the retry button 304 has been clicked, the CPU 101 may reset 1808 the game field 300. In some embodiments, resetting 1808 the game field 300 may result in the game tiles 320 being placed in the field positions 301 on the game field 300 at which the game began. In other words, resetting 1808 the game field 300 may result in the game field 300 reverting to an initial position of the game tiles 320 so that gameplay may begin again. After resetting 1808 the game field 300, the CPU 101 may exit 1810 the mouse down event.

If the retry button 304 was not selected, the CPU 101 may determine 1812 if the quit button 302 was selected. If the quit button 302 has been clicked, the CPU 101 may quit the game and load the game introduction screen 1814, so that a new game may be started. After loading the game introduction screen 1814, the CPU 101 may exit 1810 the mouse down event.

If the game is paused and neither the quit 302 nor retry 304 buttons has been selected, the CPU 101 may ignore 1816 the input and exit 1810 the mouse down event.

If the game is not paused, the CPU 101 may still make a determination 1818 1820 whether the quit 302 or retry 304 buttons were selected. If either of these buttons 302 304 has been selected, the CPU 101 may continue on to either reset 1808 the game field 300 or load 1814 the game introduction screen as described herein.

Next, the CPU 101 may determine 1822 if the mouse has been clicked over a game tile 320. For example, the CPU 101 may make this determination 1822 based on the current location of a mouse pointer on the display screen 124. In some embodiments, the CPU 101 may make this determination 1822 based on the fact that the current location of the mouse pointer is on a game tile 320 and/or on a field position 301 containing a game tile 320. If the mouse was clicked on a game tile 320, the CPU 101 may determine 1824 which game tile 320 was selected. If the CPU 101 determines 1826 that a blocking game tile 1520 has been selected, the CPU 101 may indicate graphically to the user that the currently selected group of game tiles 320 is invalid 1828 and exit 1810 the mouse down event.

If the CPU 101 does not determine 1826 that a blocking game tile 1520 was selected, the CPU 101 may add 1830 the selected game tile 320 to a currently defined grouping (e.g. 530) of game tiles 320. In some embodiments, this mouse down event on a game tile 320 may indicate that a defined grouping 530 has been created, so the CPU 101 may also set the starting field position (e.g. 410).

The CPU 101 may also graphically add 1832 a selection mark 420 to the selected game tile 320.

The CPU 101 may next determine 1834 if the current selection mode of the game is a multi-selection mode. If the game is currently in a multi-selection mode, the CPU 101 may graphically indicate 1838 the selection of a multi-dimensional array on the game field 300 and exit 1810 the mouse down event. If the game is not currently in a multi-selection mode, the CPU 101 may graphically indicate 1836 the selection of a single dimension array on the game field 300 and exit 1810 the mouse down event.

If the CPU 101 determines 1822 that the mouse was not clicked on a game tile 320, the CPU 101 may determine 1840 whether a multi-selection mode enabling portion of the game field 300 has been selected. In some embodiments, this enabling portion may be a separate button or a separate graphical element of the game field 300. For example, referring to game field 300, the multi-selection mode enabling portion may be a graphic displayed in the game items element 306, and/or in the information element 314 (FIG. 3). Such a multi-selection mode enabling portion may not always be present on the game field 300.

If the CPU 101 determines 1840 that the multi-selection mode enabling portion has been selected, the CPU 101 may check 1842 if the game is already in multi-selection mode. If the game is already in multi-selection mode, the CPU 101 may cause the game to exit 1844 multi-selection mode and exit 1810 the mouse down event. If the game is not already in multi-selection mode, the CPU 101 may cause the game to enter 1846 multi-selection mode and exit 1810 the mouse down event.

In the event that the CPU 101 does not determine that the retry button 304 has been selected 1820, the quit button 302 has been selected 1818, a game tile 320 has been selected 1822, or multi-selection mode has been selected 1840, the CPU 101 may ignore 1850 the user action and exit 1810 the mouse down event.

Figure 19:
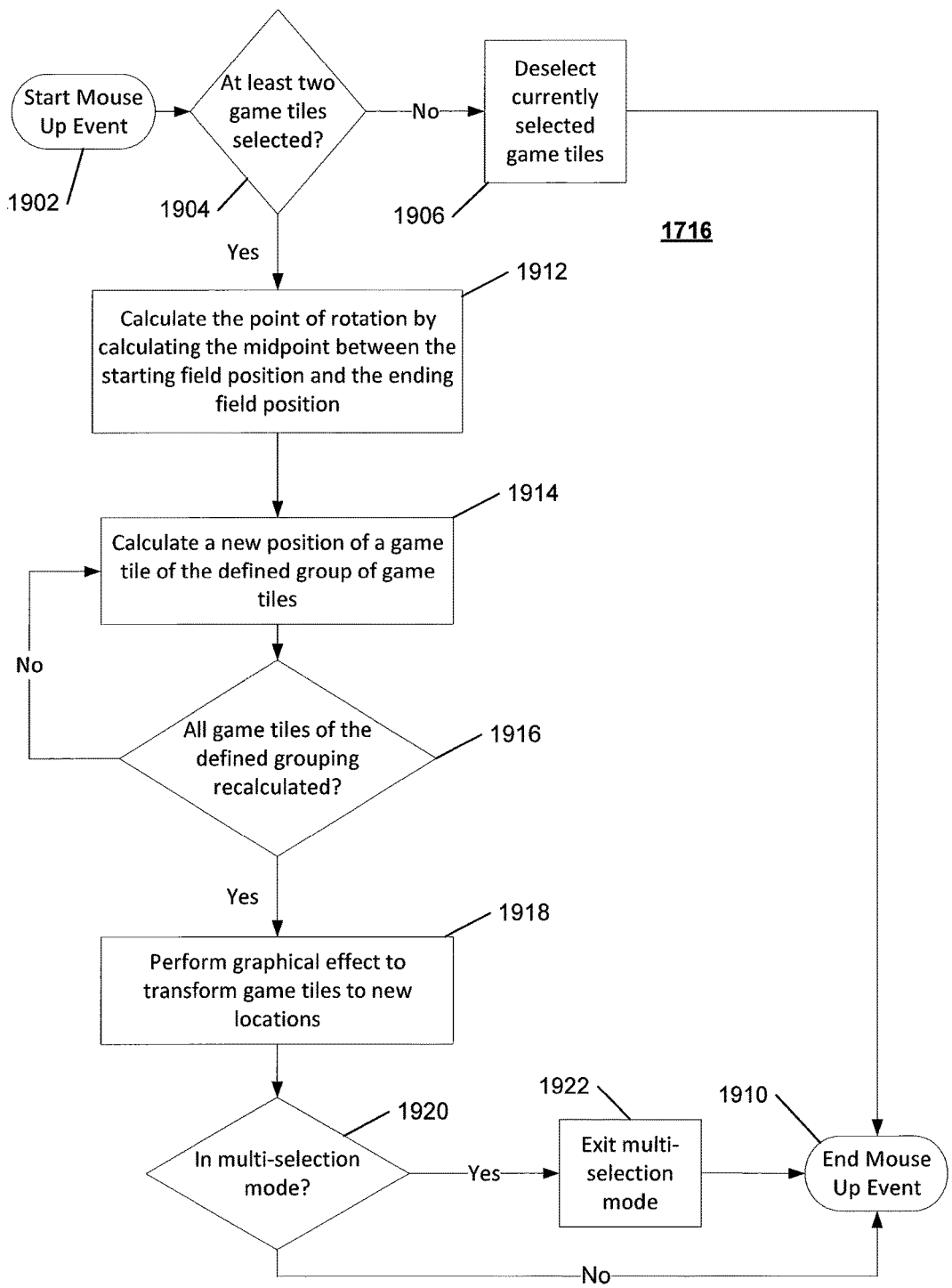

Referring to FIG. 19, a method for programming a CPU 101 of a computer device 100 to process a mouse up event 1720 is illustrated. The method may start 1902 with a determination whether at least two game tiles 320 have been selected 1904. If at least two game tiles 320 have not been selected, the CPU 101 may deselect 1906 any currently selected game tiles 320 exit 1910 the mouse up event.

If at least two game tiles 320 have been selected, the CPU 101 may calculate 1912 the point of rotation (e.g. 680) for the currently defined grouping (e.g. 530) of game tiles 320. In some embodiments, the CPU 101 may calculate 1912 the point of ration (e.g. 680) by calculating a midpoint between the starting field position (e.g. 410) and the ending field position (e.g. 590).

Responsive to calculating 1912 the point of rotation (e.g. 680) the CPU 101 may transform the defined grouping (e.g. 530) by calculating 1914 a new position of an individual game tile 320 of the defined grouping 530 of game tiles 320. The CPU 101 may repeat this calculation 1914 multiple times until making a determination 1916 that all game tiles 320 of the defined grouping (e.g. 530) have been transformed.

Once the new field positions 301 for the game tiles 320 of the defined grouping (e.g. 530) have been determined, the process may perform a graphical effect (e.g. FIGS. 14A-14D) to graphically transform on the output device (e.g. display device 124) the game tiles 320 from their current position to their new position.

The CPU 101 may then determine 1920 whether the game is currently in a multi-selection mode. If the game is in the multi-selection mode, the CPU 101 may move the game out of the multi-selection mode 1922 and exit the mouse up event 1910. If the game is not in the multi-selection mode, the CPU 101 may exit the mouse up event 1910.

Figure 20:
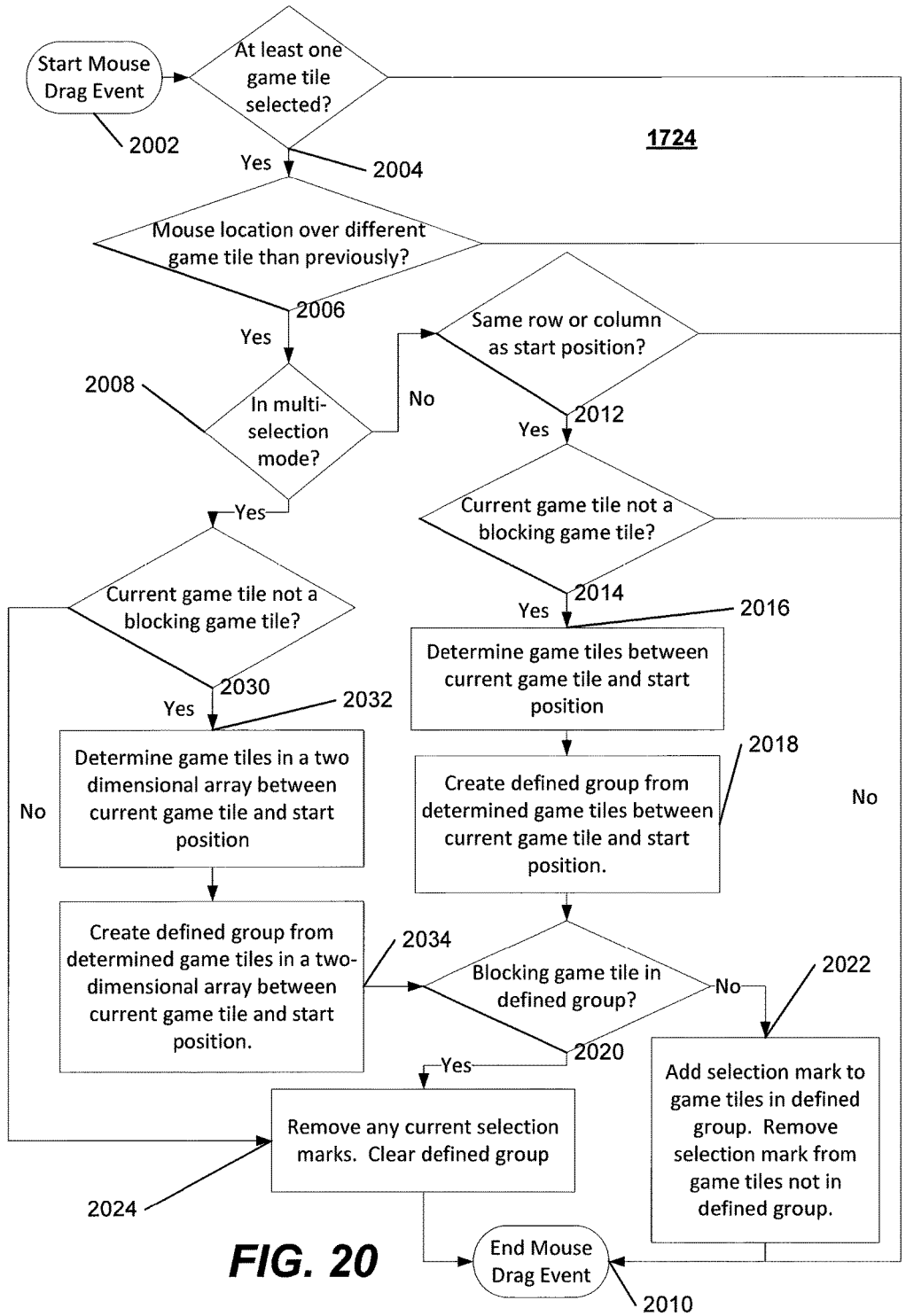

Referring to FIG. 20, a method for programming a CPU 101 of a computer device 100 to process a mouse drag event 1724 is illustrated. The method may start 2002 with a determination whether at least one game tile 320 has been selected 2004. If at least one game tile 320 has not been selected, the CPU 101 may exit 2010 the mouse drag event.

If at least one game tile 320 has been selected, the CPU 101 may determine 2006 if the current mouse location is over a game tile 320 which is different than a previously selected game tile 320. If the game tile 320 has not changed, the CPU 101 may exit 2010 the mouse drag event.

If the game tile 320 has changed, the CPU 101 may make a determination 2008 whether the game is currently in a multi-selection mode.

If the game is not currently in the multi-selection mode, the CPU 101 may make a determination 2012 whether the current game tile 320 is in the same row or column as the starting field position (e.g. 410). If the current game tile 320 is not in the same row or column as the starting field position (e.g. the mouse has been dragged beyond a starting row or column), the CPU 101 may exit 2010 the mouse drag event.

If the CPU 101 determines 2012 that the current game tile 320 is in the same row or column as the starting field position (e.g. the mouse has been dragged along a starting row or column), the CPU 101 may make a determination 2014 whether the current game tile 320 is a blocking game tile 1520. If so, the CPU 101 may exit 2010 the mouse drag event. If the current game tile 320 is not a blocking game tile 1520, the CPU 101 may determine 2016 the game tiles 320 between the current game tile 320 and the starting field position (e.g. 410). Responsive to the determination 2016, the CPU 101 may create 2018 a defined group (e.g. 530) from the determined game tiles 320 between the starting field position (e.g. 410) and the current game tile 320.

Based on this calculation 2018, the CPU 101 may next determine 2020 whether the created defined group includes a blocking game tile 1520.

If the created defined group does not include a blocking game tile 1520, the CPU 101 may add 2022 a selection mark 420 to the game tiles 320 in the created defined group of game tiles 320. The CPU 101 may also remove any selection mark 420 currently on the game field 300 from any game tiles 320 that are not a part of the created defined group. The CPU 101 may then exit 2010 the mouse drag event.

If the CPU 101 determines 2020 that the created defined group includes a blocking game tile 1520, the CPU 101 may remove 2024 any selection marks 420 from the game field 300 and may clear any currently defined grouping (e.g. 530) of game tiles 320. The CPU 101 may then exit 2010 the mouse drag event.

Referring back to the determination 2008 as to whether the game is currently in the multi-selection mode, if the game is currently in the multi-selection mode, the CPU 101 may make a determination 2030 whether the current game tile 320 is a blocking game tile 1520. If the current game tile 320 is a blocking game tile 1520, the CPU 101 may remove 2024 any selection marks 420 from the game field 300 and clear any currently defined grouping (e.g. 1130) of game tiles 320. The CPU 101 may then exit 2010 the mouse drag event.

If a determination 2030 is made that the current game tile 320 is not a blocking game tile 1520, the CPU 101 may determine which game tiles 320 are in a two-dimensional array between the current game tile 320 and the starting field position (e.g. 410).

Responsive to the determination 2030, the CPU 101 may create 2034 a defined grouping (e.g. 1130) of game tiles 320 which are in the two-dimensional array between the current game tile 320 and the starting field position (e.g. 410).

Responsive to the creation 2034 of the defined grouping (e.g. 1130), the CPU 101 may follow the operations for determining 2020 whether there is a blocking game tile 1520 within the defined grouping (e.g. 1130) and exit 2010 the mouse drag event as already described herein.

As described herein, an improved game mechanic of an electronic game may involve a processor of a computer interpreting user input provided to an input circuit of the computer. In response to the user input, the processor may determine modifications to be made to the game being played. These modifications may be output by the processor to an output circuit of the computer.

Thus, the improved game mechanic disclosed herein may provide for computational efficiencies with respect to computer operations responsive to the execution of the electronic game. In some embodiments, the improved game mechanic may improve the technology utilized for computer gameplay such that additional operations and interactions are possible for the user that were previously unavailable.

The foregoing is illustrative of the present inventive concepts and is not to be construed as limiting thereof. Although a few embodiments of the present inventive concepts have been described, many modifications are possible in the embodiments without materially departing from the novel teachings and advantages of the present inventive concepts. Accordingly, all such modifications are intended to be included within the scope and spirit of the present inventive concepts as defined in the claims. Therefore, it is to be understood that the foregoing is illustrative of the present inventive concepts and is not to be construed as limited to the embodiments disclosed herein, and that modifications to the disclosed embodiments, as well as other embodiments, are intended to be included within the scope of the appended claims. The present inventive concepts are defined by the following claims.

That which is claimed is:
1. A computer device comprising:
 a display circuit configured to display a game field comprising field positions organized in a plurality of rows and a plurality of columns with a plurality of user-selectable game tiles within respective ones of the field positions, wherein the user-selectable game tiles comprise at least two game tile categories;

a user input circuit configured to receive input from a user of the computer device selecting respective game tiles on the game field; and a processor configured to perform operations comprising:
receiving a first user input from the user input circuit indicating a starting field position on the game field;
receiving a second user input from the user input circuit indicating an ending field position on the game field, wherein the starting field position and the ending field position define a grouping of at least three game tiles in field positions on the game field between, the starting field position and the ending field position;
determining a point of rotation for the grouping within the grouping;
exchanging respective game tiles of the grouping from a respective first field position to a respective second field position that is calculated relative to the point of rotation;
displaying the exchanged game tiles on the game field in the respective second field positions;
determining that a game tile matching condition is present on the game field, wherein the game tile matching condition comprises at least three game tiles of a same game tile category adjacent one another in a horizontal row or a vertical column; and
modifying an output of the display circuit to selectively remove the at least three game tiles of the same game tile category from respective field positions on the game field.

2. The computer device of claim 1, wherein the grouping comprises a rectangular grouping of game tiles comprising at least two rows of field positions, and, at least two columns of field positions.

3. The computer device of claim 2 wherein the first user input comprises selection by the user on the game field of a first location of a first vertex of the rectangular grouping and the second user input comprises selection by the user on the game field of a second location of a second vertex of the rectangular grouping that is diagonally opposite the first vertex.

4. The computer device of claim 3, wherein the operations further comprise receiving a third user input indicating a third vertex of the rectangular grouping.

5. The computer device of claim 1, wherein the operations further comprise exchanging the respective game tiles of the grouping by displaying, via the display circuit, a visual rotation of the game tiles about the point of rotation in a clockwise or counterclockwise rotation in a direction parallel to the game field.

6. The computer device of claim 5, wherein the game field further comprises a blocking game tile, and
wherein the operations further comprise indicating that the grouping is not possible if the grouping would include the blocking game tile.

7. The computer device of claim 5, wherein the game field further comprises a blocking game tile, and
wherein the operations further comprise indicating that the exchange of the respective game tiles of the grouping is not possible if the visual rotation of the game tiles about the point of rotation would intercept with the blocking game tile.

8. The computer device of claim 1, wherein the operations further comprise exchanging the respective game tiles of the grouping by displaying, via the display circuit, a contracting visual effect of the game tiles of the grouping to the point of rotation followed by an expanding visual effect of the game tiles of the grouping to the second field positions.

9. The computer device of claim 1, wherein the operations further comprise exchanging the respective game tiles of the grouping by displaying, via the display circuit, a fading out visual effect of the game tiles of the grouping followed by a fading in visual effect of the game tiles of the grouping to the second field positions.

10. The computer device of claim 1, wherein the operations further comprise exchanging the respective game tiles of the grouping by displaying, via the display circuit, a serial replacement of respective game tiles within the grouping by replacing the respective game tile at the first field position with a second game tile at the second field position.

11. The computer device of claim 1, wherein the operations further comprise displaying a graphical representation of the grouping to the user of the computer device responsive to receiving the first user input and the second user input and prior to exchanging the respective game tiles of the grouping.

12. A method of operating a computing device comprising:
displaying a game field comprising field positions organized in a plurality of rows and a plurality of columns with a plurality of user-selectable game tiles within respective ones of the field positions, wherein the user-selectable game tiles comprise at least two game tile categories;
receiving a first user input from a user of the computing device indicating, a starting field position on the game field;
receiving a second user input indicating an ending field position on the game field, wherein the starting field position and the ending field position define a grouping of at least three game tiles in field positions on the game field between the starting field position and the ending field position;
determining a point of rotation for the grouping within the grouping;
exchanging respective game tiles of the grouping from a respective first field position to a respective second field position that is calculated relative to the point of rotation;
displaying the exchanged game tiles on the game field in the respective second field positions;
determining that a game tile matching condition is present on the game field, wherein the game tile matching condition comprises at least three game ti les of a same game tile category adjacent one another in a horizontal row or a vertical column, and wherein the at least three game tiles occupy third field positions on the game field; and
selectively removing the at least three game tiles of the same game tile category from the third field positions on the game field,
wherein receiving the second user input indicating the ending field position on the game field comprises receiving a selection by the use of a location of the ending field position on the game field, and
wherein the method further comprises displaying a graphical representation of the grouping responsive to receiving the first user input and the second user input and prior to exchanging the respective game tiles of the grouping.

13. The method of claim 12, wherein the grouping comprises a rectangular grouping of game tiles comprising at least two rows of field positions and at least two columns of field positions.

14. The method of claim 13, wherein the first user input comprises selection by the user on the game field of a first location of a first vertex of the rectangular grouping and the second user input comprises selection by the user on the game field of a second location of a second vertex of the rectangular grouping that is diagonally opposite the first vertex.

15. The method of claim 14, wherein the method further comprises receiving a third user input indicating a third vertex of the rectangular grouping.

16. The method of claim 12, wherein the method further comprises exchanging the respective game tiles of the grouping by displaying a visual rotation of the game tiles about the point of rotation in a clockwise or counterclockwise rotation in a direction parallel to the game field.

17. A computer program product comprising:
a tangible non-transitory computer readable storage medium comprising computer readable program code embodied in the computer readable storage medium that when executed by at least one processor causes the at least one processor to perform operations comprising
displaying a game field comprising field positions organized in a plurality of rows and, a plurality of columns with a plurality of user-selectable game tiles within respective ones of the field positions, wherein the user-selectable game tiles comprise at least two game tile categories;
receiving a first user input from a user indicating a starting field position on the game field;
receiving a second user input indicating an ending field position on the game field, wherein the starting field position and the ending field position define a grouping of at least three game tiles in field positions on the game field between the starting field position and the ending field position;
determining a point of rotation for the grouping within the grouping;
exchanging respective game tiles of the grouping from a respective first field position to a respective second field position that is calculated relative to the point of rotation;
displaying the exchanged game tiles on the game field in the respective second field positions;
determining that a game tile matching condition is present on the game field, wherein the game tile matching condition comprises at least three game tiles of a same game tile category adjacent one another in a horizontal row or a vertical column; and
selectively removing the at least three game tiles of the same game tile category from respective field positions on the game field.

18. The computer program product of claim 17, wherein the grouping comprises a rectangular grouping of game tiles comprising at least two rows of field positions and at least two columns of field positions, and
wherein the first user input comprises a first vertex of the rectangular grouping and the second user input comprises a second vertex of the rectangular grouping that is diagonally opposite the first vertex.

19. The computer program product of claim 17, wherein receiving the second user input indicating the ending field position on the game field comprises receiving a selection by the user of a location of the ending field position on the game field, and
wherein, the operations further comprise displaying a graphical representation of the grouping responsive to receiving the first user input and the second user input and prior to exchanging the respective game tiles of the grouping.

20. The computer program product of claim 17, wherein the operations further comprise:
after selectively removing the at least three game tiles of the same game tile category from the respective field positions on the game field, moving other ones of the plurality of user-selectable game tiles into the respective field positions from which the at least three game tiles of the same game tile category were selectively removed.

* * * * *

UNITED STATES PATENT AND TRADEMARK OFFICE
CERTIFICATE OF CORRECTION

PATENT NO. : 10,195,534 B2  
APPLICATION NO. : 15/485713  
DATED : February 5, 2019  
INVENTOR(S) : Samuel Adam Kushner It is certified that error appears in the above-identified patent and that said Letters Patent is hereby corrected as shown below:

In the Claims

Column 29, Line 13, Claim 1:  
Please correct "between, the" to read -- between the --

Column 29, Line 34, Claim 2:  
Please correct "positions, and, at least" to read -- positions and at least --

Column 30, Line 32, Claim 12:  
Please correct "indicating, a starting field" to read -- indicating a starting field --

Column 30, Line 51, Claim 12:  
Please correct "ti les" to read -- tiles --

Column 30, Line 61, Claim 12:  
Please correct "use" to read -- user --

Column 31, Line 28, Claim 17:  
Please correct "a plurality of rows and, a plurality" to read -- a plurality of rows and a plurality --

Signed and Sealed this  
Twenty-first Day of May, 2019

Andrei Iancu  
*Director of the United States Patent and Trademark Office*